United States Patent [19]

Nashiki

[11] Patent Number: 4,743,825

[45] Date of Patent: May 10, 1988

[54] SYNCHRONOUS MOTORS AND A CONTROL SYSTEM THEREOF

[75] Inventor: Masayuki Nashiki, Nagoya, Japan

[73] Assignee: Kabushiki Kaisha Okuma Tekkosho, Aichi, Japan

[21] Appl. No.: 935,188

[22] Filed: Nov. 26, 1986

Related U.S. Application Data

[63] Continuation of Ser. No. 650,675, Sep. 13, 1984.

[30] Foreign Application Priority Data

| Sep. 27, 1983 | [JP] | Japan | 58-182341 |
| Sep. 27, 1983 | [JP] | Japan | 58-18234 |
| Oct. 27, 1983 | [JP] | Japan | 58-201799 |
| Oct. 27, 1983 | [JP] | Japan | 58-201800 |

[51] Int. Cl.$^4$ .................................. H02P 5/40
[52] U.S. Cl. .................................. 318/723; 318/722
[58] Field of Search ............... 318/701, 722, 723, 737, 318/808; 310/162, 168, 269, 184, 185

[56] References Cited

U.S. PATENT DOCUMENTS

| 2,449,506 | 9/1948 | Pollard | 310/269 |
| 2,872,605 | 2/1969 | Moore et al. | 310/269 |
| 3,157,806 | 11/1969 | Wiedemann | 310/269 |
| 3,448,310 | 6/1969 | Lawrenson | 310/162 |
| 3,704,402 | 11/1972 | Leitgeb | 318/701 |
| 3,956,678 | 5/1976 | Byrne et al. | 310/168 |
| 3,995,203 | 11/1976 | Torok | 318/701 |
| 4,075,521 | 2/1978 | Nordebo | 310/184 |
| 4,459,534 | 7/1984 | Nagase et al. | 318/808 |
| 4,527,109 | 7/1985 | Hosokawa et al. | 318/723 |

OTHER PUBLICATIONS

Le-Huy et al., "Microprocessor Control of a Current-Fed Synchronous Motor Drive", Conference: Industry Applications Society IEEE-IAS Annual Meeting, Cleveland, OH, U.S.A., Sep. 30–Oct. 4, 1979.

Primary Examiner—David Smith, Jr.
Attorney, Agent, or Firm—Wenderoth, Lind & Ponack

[57] ABSTRACT

In the prior art, a DC motor is often utilized for controlling speed of servomechanism for its simpleness in operation and excellent control. However, as a DC motor is equipped with brushes and commutators, it inconveniently requires periodical maintenance and inspections in order to keep normal operation. As electric semiconductors such as power transistors along with control technology have made a remarkable progress in recent years, a demand for motors which do not need maintenance is keenly felt. Studies have been conducted on control by DC motors and some have been put into practice. According to this invention, there is provided a synchronous motor which has a small field loss and which does not need slip rings or rotary transformers. Further, there is provided synchronous motor which can be simply constructed at a low cost without using a permanent magnet as a rotor and which can realize a larger capacity, and provided a control unit for the synchronous motor.

16 Claims, 21 Drawing Sheets

FIG. 15A Flu
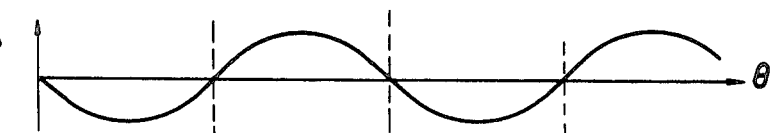
FIG. 15B Flv
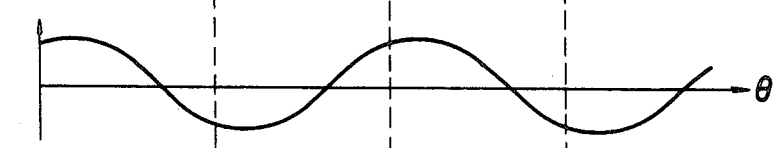
FIG. 15C Flw
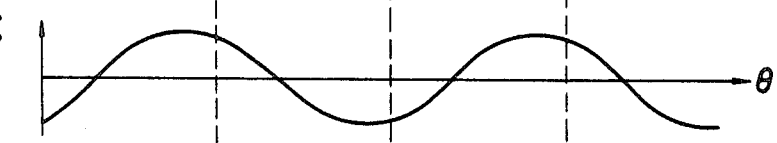
FIG. 15D Bu
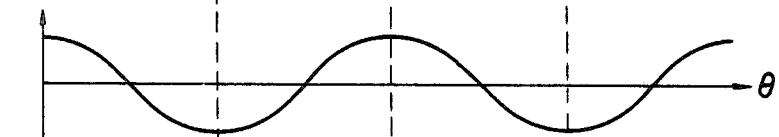
FIG. 15E Alu
FIG. 15F Alv
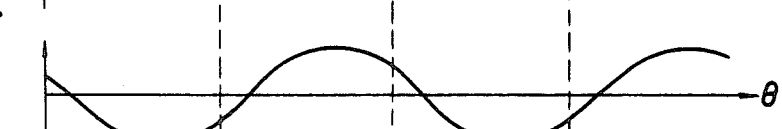
FIG. 15G Alw
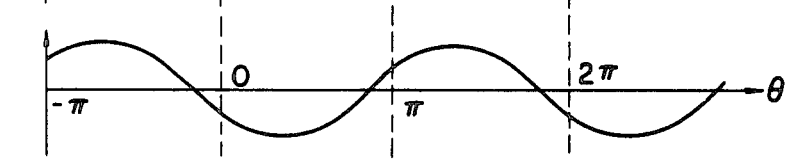

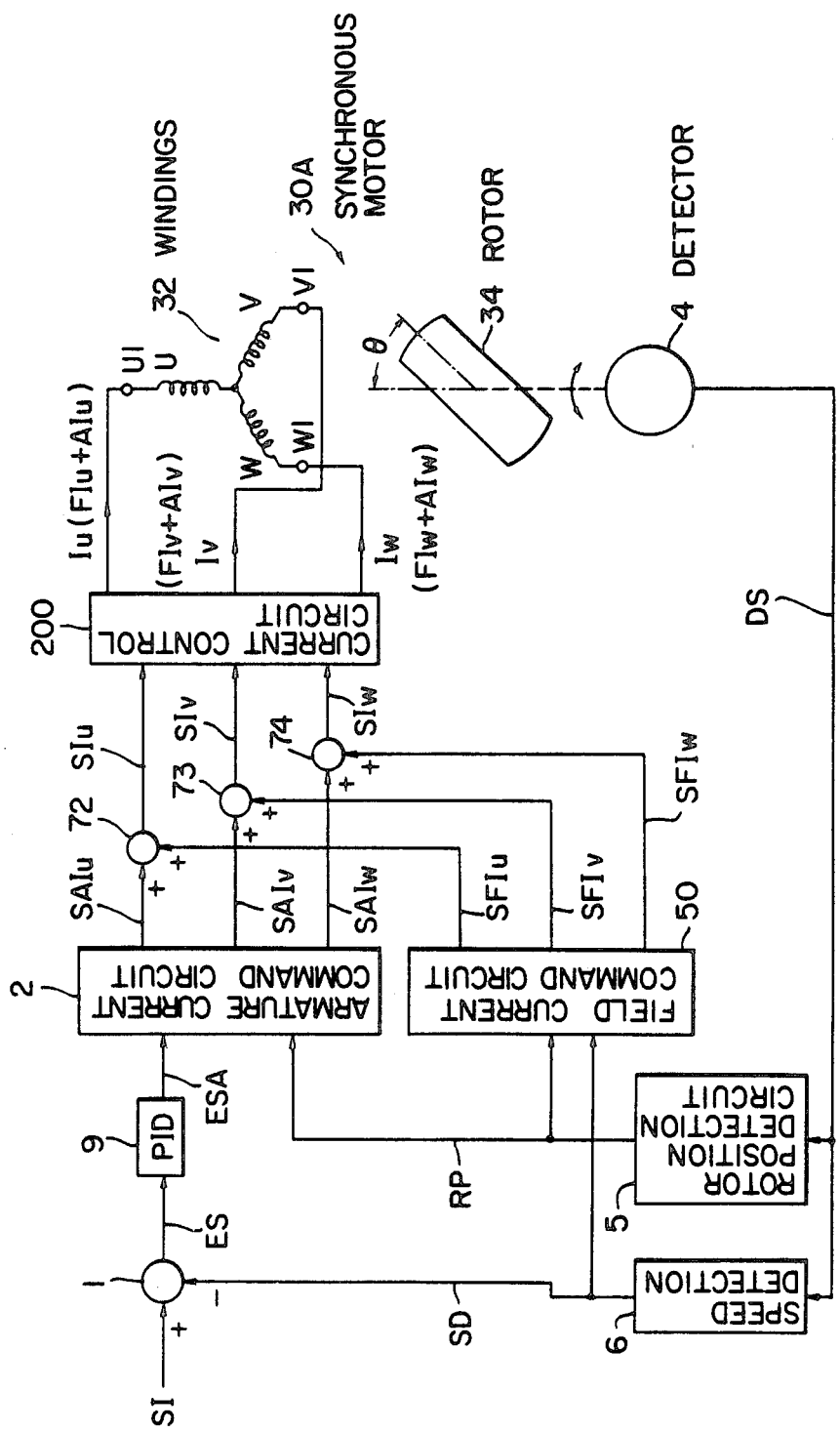

FIu

FIv

FIw

Bu

AIu

AIv

AIw

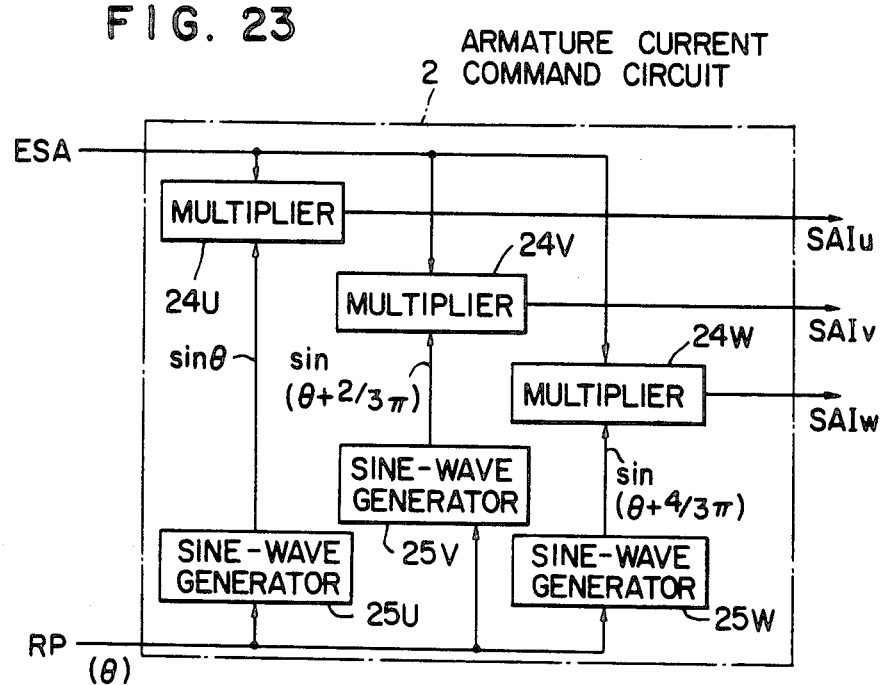
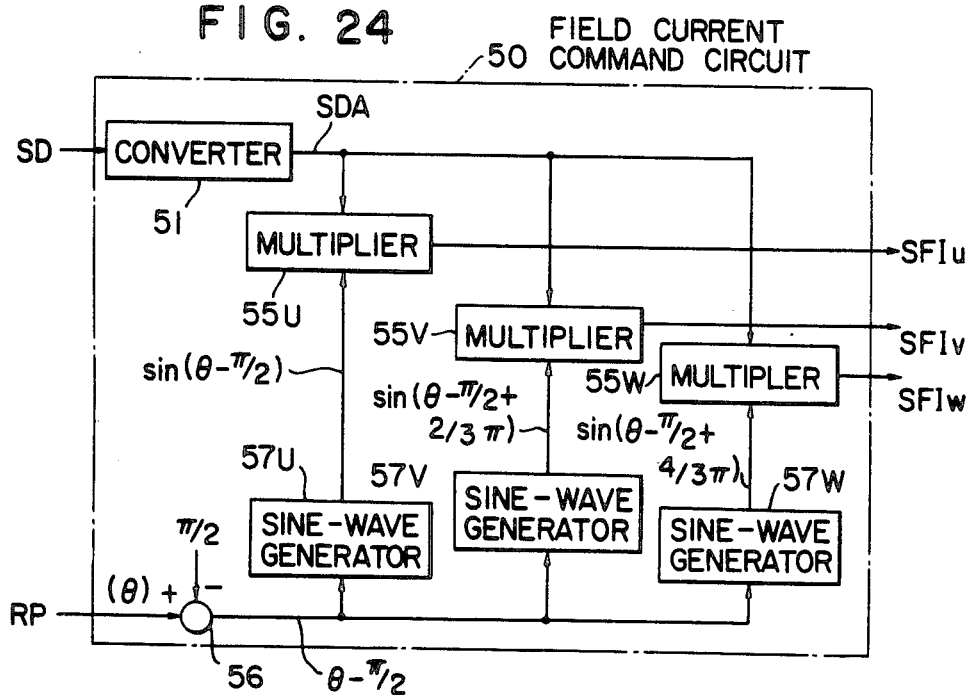

SYNCHRONOUS MOTORS AND A CONTROL SYSTEM THEREOF

This application is a continuation of now abandoned application Ser. No. 650,675, filed Sept. 13, 1984.

BACKGROUND OF THE INVENTION

This invention relates to novel synchronous motors and the control units thereof.

In the prior art, a DC motor is often utilized for controlling the speed of servomechanism for its simpleness in operation and excellent control. However, since a DC motor is equipped with brushes and commutators, it inconveniently requires periodic maintenance and inspections in order to keep normal operation. Since semiconductors such as power transistors along with control technology have made a remarkable progress in recent years, a demand for motors which do not need maintenance is keenly felt. Studies have been conducted on control by AC motors and some have been put into practice.

FIGS. 1 and 2 show an example of the structure and the control unit of a prior art synchronous motor of an electromagnetic field type wherein a synchronous motor 10 has armature windings 11 of three phases (U-phase, V-phase and W-phase) which are wound around a stator, and a rotor 12 is wound with a field winding 13. FIG. 2 shows such a conventional synchronous motor 10 in cross section wherein a cylindrical casing 16 houses a laminated electromagnetic iron core 15 for the stator. On the inner periphery of the electromagnetic iron core 15 are bored plural slots 14 at uniform intervals on which armature windings 11 are wound. The armature windings 11 are formed in the slots 14 by distributed windings (or concentrated windings). A salient pole rotor 12 of a bipolar type is provided in the vacant space of the electromagnetic iron core 15 of the stator in a rotatable manner. The field winding 13 around the rotor 12 is supplied with current from a field circuit outside the motor via a slip ring.

The synchronous motor 10 of this type is controlled by a control unit such as the one shown in FIG. 1. A detector 4 is mechanically connected to a rotational shaft of the rotor 12 for detecting rotational speed and position thereof. Detection signal DS from the detector 4 is inputted in a rotor position detection circuit 5 and a speed detection circuit 6 for detecting the position and the speed of the rotor 12, respectively. A speed command SI from another control unit (for instance, a computer) is inputted into a subtractor 1, and the speed deviation ES between a speed signal SD from the speed detection circuit 6 and the speed command SI is inputted into a PID (proportional, integral and difference) compensating circuit 9, and a torque command ESA output therefrom is inputted into an armature current command circuit 2 to form command currents $SI_u$, $SI_v$ and $SI_w$ for the three-phase armature. These command currents $SI_u$ through $SI_w$ are inputted into an armature current control circuit 3 to be supplied to the three-phase armature windings 11 of the synchronous motor 10 as the armature currents $I_u$, $I_v$ and $I_w$. The field winding 13 of the rotor 12 is supplied with current via a slip ring from a field current control circuit 8 in correspondence with a field current command FS from a field current command circuit 7. The detailed construction of the armature current command circuit 2 is shown in FIG. 3. The command circuit 2 is provided with memories (e.g., ROMS) 22U, 22V and 22W which digitally store the sine-waves in the U-phase, V-phase and W-phase, respectively. Corresponding to the value of the rotor position signal RP from the rotor position detection circuit 5, sine-wave data stored in the memories 22U through 22W can be accessed from a memory addressing circuit 21. The sine-wave data which are accessed from the memories 22U through 22W are inputted into D/A converters 23U through 23W to be converted to analog signals, respectively. The sine-wave signals in analog are respectively inputted to multipliers 24U through 24W. The torque command ESA obtained from the PID compensation circuit 9 is inputted into the multipliers 24U, 24V and 24W and multiplied with the sine-wave signals from the D/A converters 23U, 23V and 23W, respectively. An electrical current in accordance with the result of above multiplication which indicates position and speed deviation ES is inputted into the armature current control circuit 3 as armature current commands $SI_u$, $SI_v$ and $SI_w$. Subsequently, current-controlled armature currents $I_u$, $I_v$ and $I_w$ are supplied to the synchronous motor 10.

In such a structure as stated above, the armature current command circuit 2 reads out the digital values of the sine-waves stored in the memories 22U through 22W in correspondence with the rotor position signal RP from the rotor position detection circuit 5. After being converted into analog signals, they are multiplied in accordance with the speed deviations ES between the speed command SI and the actually detected speed signal SD from the speed detection circuit 6. The armature current command circuit 2 therefore outputs armature current commands $SI_u$ through $SI_w$ so as to make the speed command SI coincide with the speed of the rotor 12. In this manner, the synchronous motor 10 can control the rotation of the rotor 12 at the rate of the speed command SI through the armature current control circuit 3.

The torque T generated from the synchronous motor 10 can be expressed by the equation below if it is assumed that the position of the rotor 12 is $\theta$, the relative phase between the armature current I and magnetic flux density B is $\alpha$, the magnetic flux density B is distributed in a cosine-wave around the position $\theta$ of the rotor 12, and phase armature currents $I_u$ through $I_w$ are respectively distributed in cosine-wave synchronization with the magnetic flux density B which crosses perpendicularly.

$$\begin{aligned} T &\propto B_u I_u + B_v I_v + B_w I_w \\ &= B_o \cos\theta \times I_o \cos(\theta + \alpha) + B_o \cos\left(\theta + \frac{2}{3}\pi\right) \times \\ &\quad I_o \cos\left(\theta + \alpha + \frac{2}{3}\pi\right) + B_o \cos\left(\theta + \frac{4}{3}\pi\right) \times \\ &\quad I_o \cos\left(\theta + \alpha + \frac{4}{3}\pi\right) \\ &= \frac{3}{2} B_o I_o \cos\alpha \end{aligned} \tag{1}$$

Wherein $B_o$ and $I_o$ respectively represent the maximum values of the magnetic flux density and the armature current when $\theta = 0$. If the magnetic flux density B is synchronized with respective currents of the three phases, it holds that $\alpha = 0°$ and $$T \propto (3/2 B_o I_o) \tag{2}$$

If an ideal control is carried out, the output torque T of the synchronous motor 10 is relevant only to the magnetic flux density B and the magnitude of the armature current I. Therefore, if it is assumed that the magnetic flux density B is constant, since the output torque T of the motor becomes dependent only on the magnitude of the armature current I, the torque T can be controlled as excellently as in the case of the DC motor.

However, since such a conventional synchronous motor 10 is equipped with the field winding 13 on the rotor 12, it requires a power amplifier and a control circuit for controlling the field current as well as a slip ring or a rotary transformer for feeding the field current to the side of the rotor 12. Furthermore, if a permanent magnet is used on the rotor since a field of the synchronous motor, as the permanent magnet per se is expensive and requires a complex structure for fixing the permanent magnet on a shaft and so on, it presents difficulties cost-wise in making the capacity larger. Moreover, since the magnitude of the field is constant, the inductive voltage of the stator winding becomes proportional to the rate of rotation, thereby placing an upper limit on the controllable rotational speed range.

SUMMARY OF THE INVENTION

An object of this invention is to provide a synchronous motor which has a small field loss and which does not need a slip ring, a rotary transformer and so on.

Another object of this invention is to provide a synchronous motor which can be simply constructed at a low cost without using a permanent magnet as a rotor and which can realize a larger capacity.

Still another object of this invention is to provide a useful control unit for the novel synchronous motor.

Still another object of this invention is to provide a control unit for such synchronous motor which is simple in construction but can be manufactured efficiently at a low cost.

According to this invention in one aspect thereof, for achieving the objects described above, there is provided a synchronous motor which is characterized in that armature windings and field windings are respectively wound around a stator of the motor and that a rotor comprises a salient-pole magnetic material having a plural magnetic poles, and in another aspect of the invention there is also provided a control unit for the synchronous motor which comprises a rotor position detection means for detecting the position of the rotor, a speed detection means for detecting the speed of the rotor, an armature current command means which receives as its input a speed command and the deviation therefrom in the speed detected by the speed detection means and receives the position signal detected by the rotor position detection means to form an armature current command, a field current command means which receives as its input the detected speed and position signals to form a field current command, an armature current control means which receives as its input the armature current command and supplies armature current to the armature windings, and a field current control means which receives as its input the field current command and supplies field current to the field windings.

Further, according to this invention in still another aspect thereof, for achieving the objects described above, there is provided a synchronous motor which is characterized in that a stator of the motor is wound with windings for the use of an armature and a field and that a rotor comprises a salient-pole magnetic material having plural magnetic poles, and in still another aspect of the invention there is also provided a control unit for the synchronous motor which comprises a rotor position detection means and a speed detection means for detecting the position and the speed of the rotor, an armature current command means which receives as its input a speed command and the deviation therefrom of the speed detected by the speed detection means and receives as its input the position detected from the rotor position detection means to form as armature current command, a field current command means which receives the detected speed and the position as its input and forms a field current command, and a current control means which receives as its input signals obtained by adding the armature current command and field current command and supplies current to the windings.

The nature, principle and utility of the invention will become more apparent from the following detailed description when read in conjunction with the accompanying drawings.

BRIEF DESCRIPTION OF THE DRAWINGS

In the accompanying drawings:

FIGS. 15A through 15G are waveform charts showing examples of the operation of FIG. 11, respectively;

FIG. 19 is a block diagram showing an embodiment of the synchronous motor and the control unit therefor according to this invention;

FIGS. 23 and 24 are block diagrams showing another embodiment of the partial circuit of the control unit shown in FIG. 19, respectively;

DESCRIPTION OF THE PREFERRED EMBODIMENTS

The present invention will be described hereinafter.

The synchronous motor according to this invention is of the type where armature windings and field windings are respectively wound around a stator, and a rotor is made of a magnetic material having plural magnetic poles. The control unit thereof comprises a means for detecting the position and the speed of a rotor, an armature current command means for receiving as its input a deviation of the speed detected by the speed detecting means from a speed command as well as the position detected by the rotor position detecting means in order to form an armature current command, a field current command means for receiving as its input the detected speed and the detected position and forming a field current command, an armature current control means for receiving as its input the armature current command and supplying armature current to the armature windings and a field current control means for receiving as its input the field current command and supplying field current to the field windings.

Figure 4:
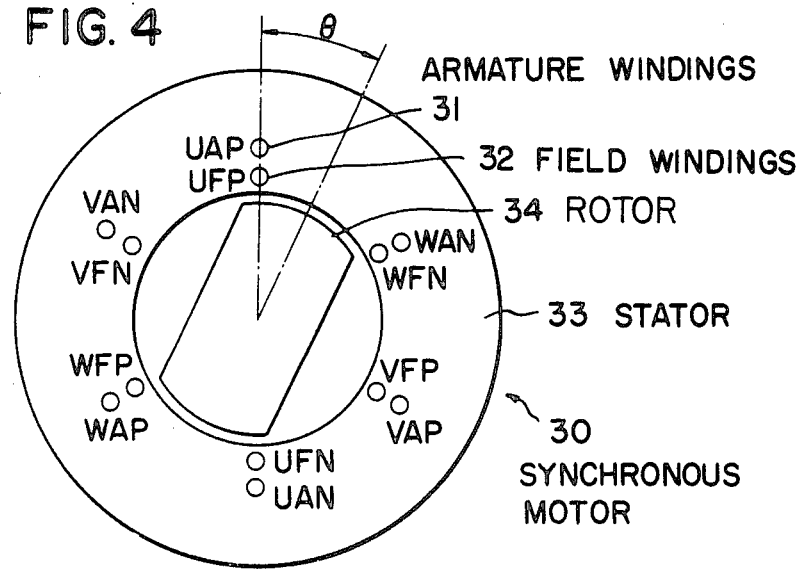
FIG. 4 is a schematic view showing an example of the structure of a synchronous motor according to this invention.
Figure 5:
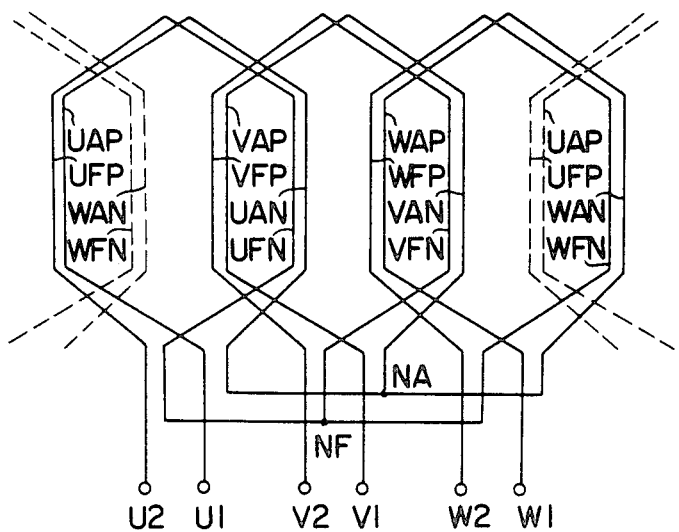
FIG. 5 is a view showing the state of the windings of FIG. 4.

FIG. 4 shows the structure of an embodiment of a synchronous motor 30 of this invention using concentrated windings. A stator 33 is wound with armature windings 31 and field windings 32, respectively. Inside the space of the stator 33 is provided a bipolar rotor 34 of the salient pole type which is made of a magnetic material (such as silicon steelsheet, magnetic steel bands, soft ferrite, etc.). The armature windings 31 and the field windings 32 are wound as shown in FIG. 5, U-phase winding of the armature windings 31 is connected from an input terminal U1 to a connection NA via windings UAP and UAN; the V-phase winding is connected from an input terminal V1 to the connection NA via windings VAP and VAN, and the W-phase winding is connected from an input terminal W1 to the connection NA via windings WAP and WAN. In a manner similar to the armature windings 31, the field windings 32 are wound. The U-phase winding is connected from an input terminal U2 to a connection NF via windings UFP and UFN while the V-phase winding is connected from an input terminal V2 to the connection NF via windings VFP and VFN, and the W-phase winding is connected from an input terminal W2 to the connection NF via windings WFP and WFN. Although the windings are shown as concentrated windings for facilitating a description in this figure, they may be distributed windings. The numbers of turns of the armature windings 31 and the field windings 32 are almost equal to each other since the voltages of their respective current control circuits are of almost the same structure.

The diameter of a winding is greater in the armature winding 31 than in the field winding 32.

Figure 6:
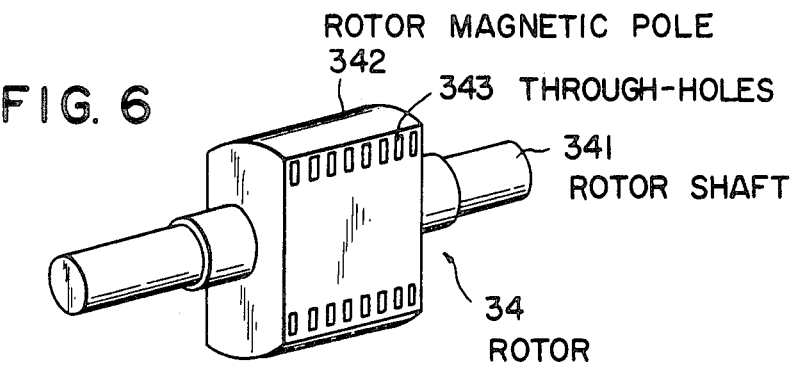
FIG. 6 is a perspective view showing an example of the rotor structure of the synchronous motor.

FIG. 6 shows the structure of an embodiment of a rotor 34 of the synchronous motor 30. A rotor magnetic pole 342 is provided at the axial center of a cylindrical rotor shaft 341, the rotor being formed by laminating magnetic material sheets such as silicon steel sheets of an elongated form with curved ends. Both ends of the rotor magnetic pole 342 are provided with plural rectangular through-holes 343 which are bored in the rotational direction in order to prevent magnetic polarization in the rotor 34.

Although the stator is wound with the armature windings 31 and with field windings 32 inside the windings 31 in the above description, it may be wound with the field windings 32 and then with the armature windings 31 inside the field windings 32. In the above description, three-phase armature windings and the field windings are disclosed, but multiple phases of four or more phases may be employed.

Figure 7:
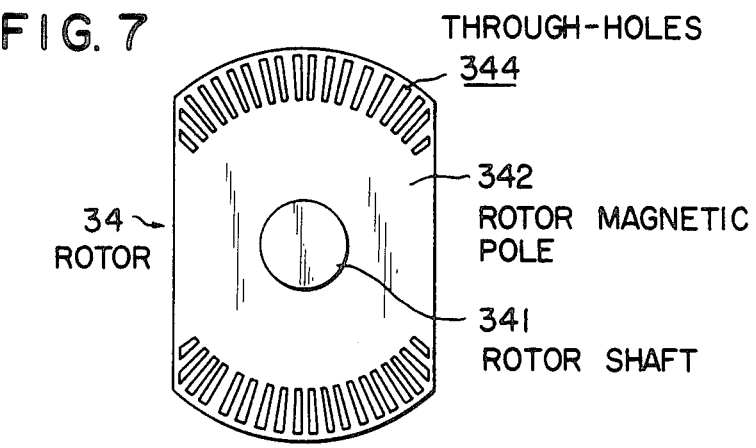
FIGS. 7 through 10 are views respectively showing the structure of other embodiments of the rotor.
Figure 8:
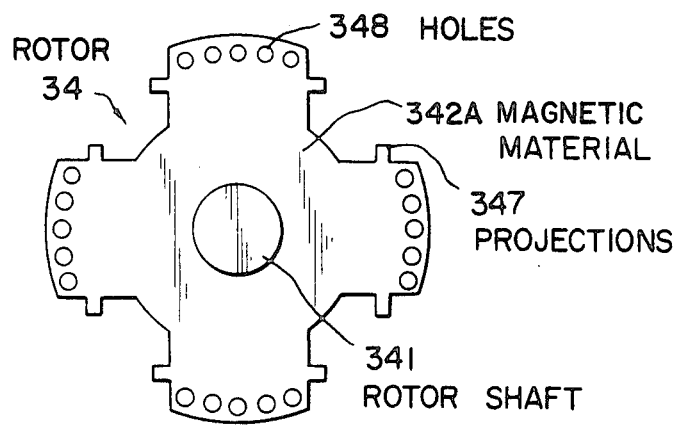
Figure 9:
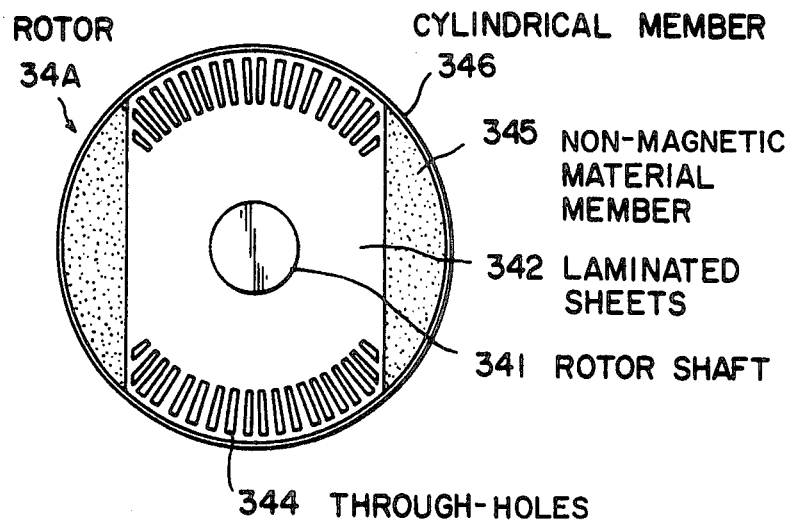
Figure 10:
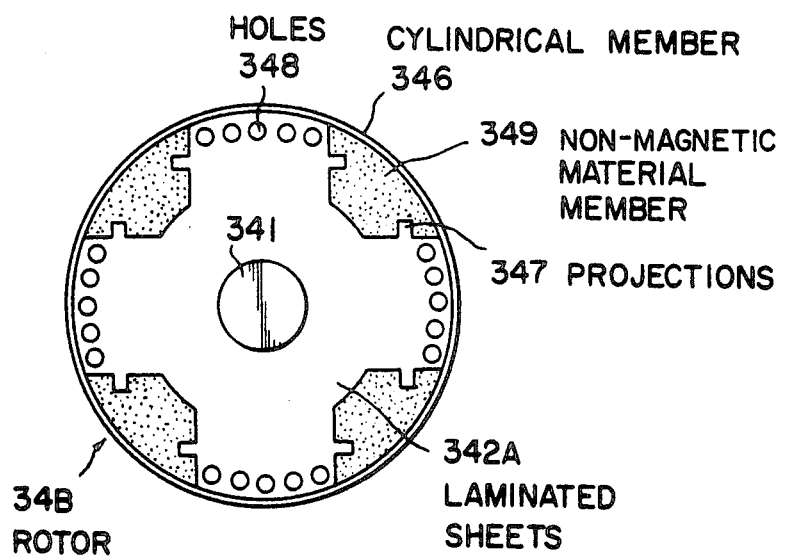

FIG. 7 shows another embodiment of the bipolar rotor of the synchronous motor which is provided with a plurality of through-holes 344 which are bored in the thrust direction in the form of a rectangle or a trapezoid which are aligned in the rotational direction in order to prevent polarization. FIG. 8 shows an embodiment of a 4-pole rotor. Plural cylindrical holes 348 which are bored in the thrust direction are provided on respective ends of a laminated cross-shaped magnetic material 342A such as silicon sheet steel in order to prevent polarization on the rotor. Projections 347 are provided to fix non-magnetic material which will be described hereinafter. The rotor 34A shown in FIG. 9 is mounted with a fixed cylindrical member 346 on the outer periphery thereof in order to reduce the winding resistance while rotating. A non-magnetic material member 345 such as a synthetic resin is filled in the space between the thin-plate cylindrical member 346 and the laminated sheets 342 of the salient-pole rotor so as to facilitate the smooth rotation of the rotor 34A. FIG. 10 shows another similar embodiment wherein the 4-polar salient-pole type rotor 34B is mounted with a thin-plate cylindrical member 346 on the outer periphery thereof, and a non-magnetic material 349 is filled in the space between the cylindrical member 346 and the laminated sheets 342A of the salient-pole type rotor so as to enhance the smooth rotation of the rotor 34B.

Figure 11:
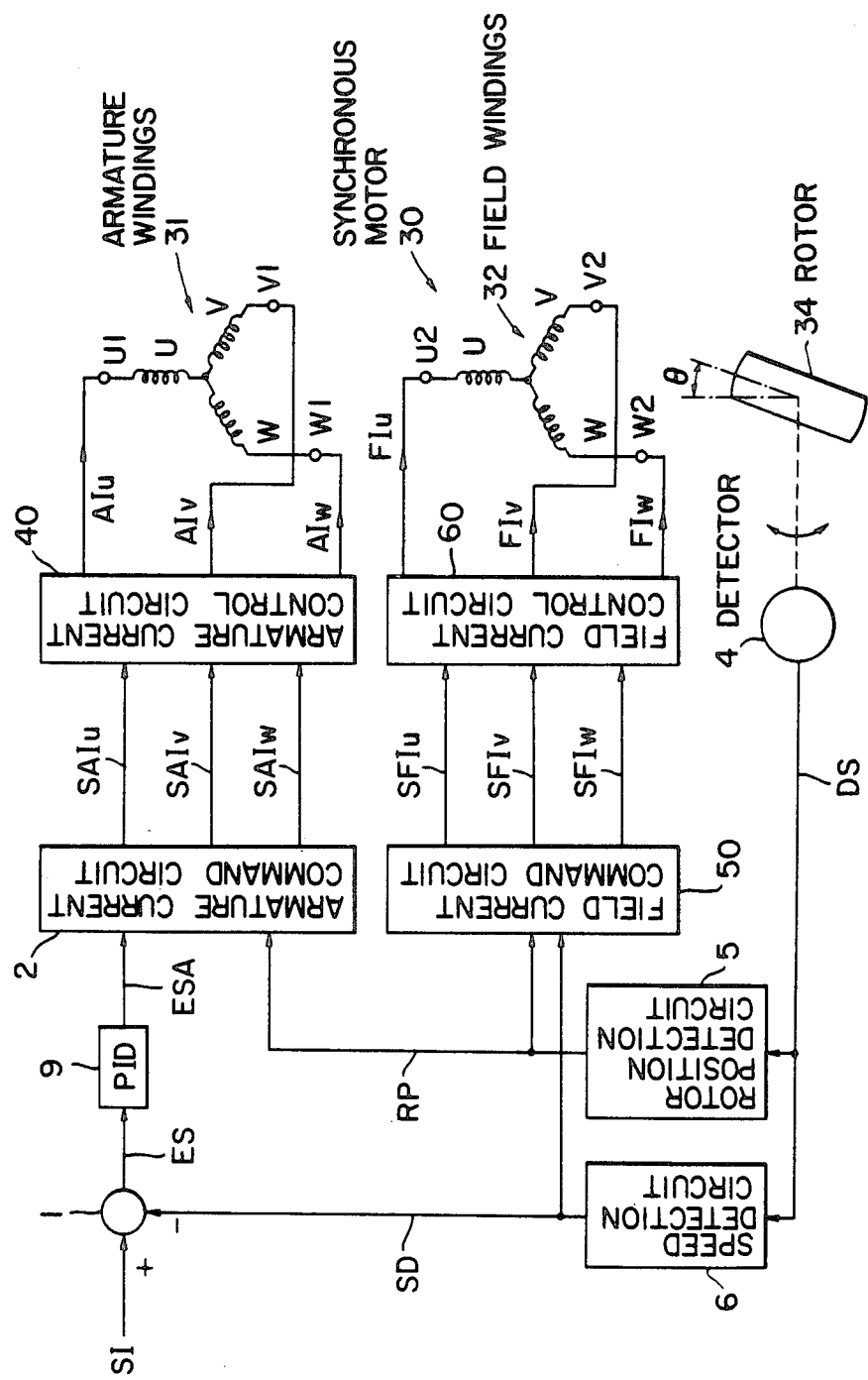
FIG. 11 is a block diagram showing an embodiment of the synchronous motor and the control unit therefor according to this invention.

A description will now be provided on a control unit for controlling above mentioned synchronous motor 30 referring to FIG. 11.

Figure 1:
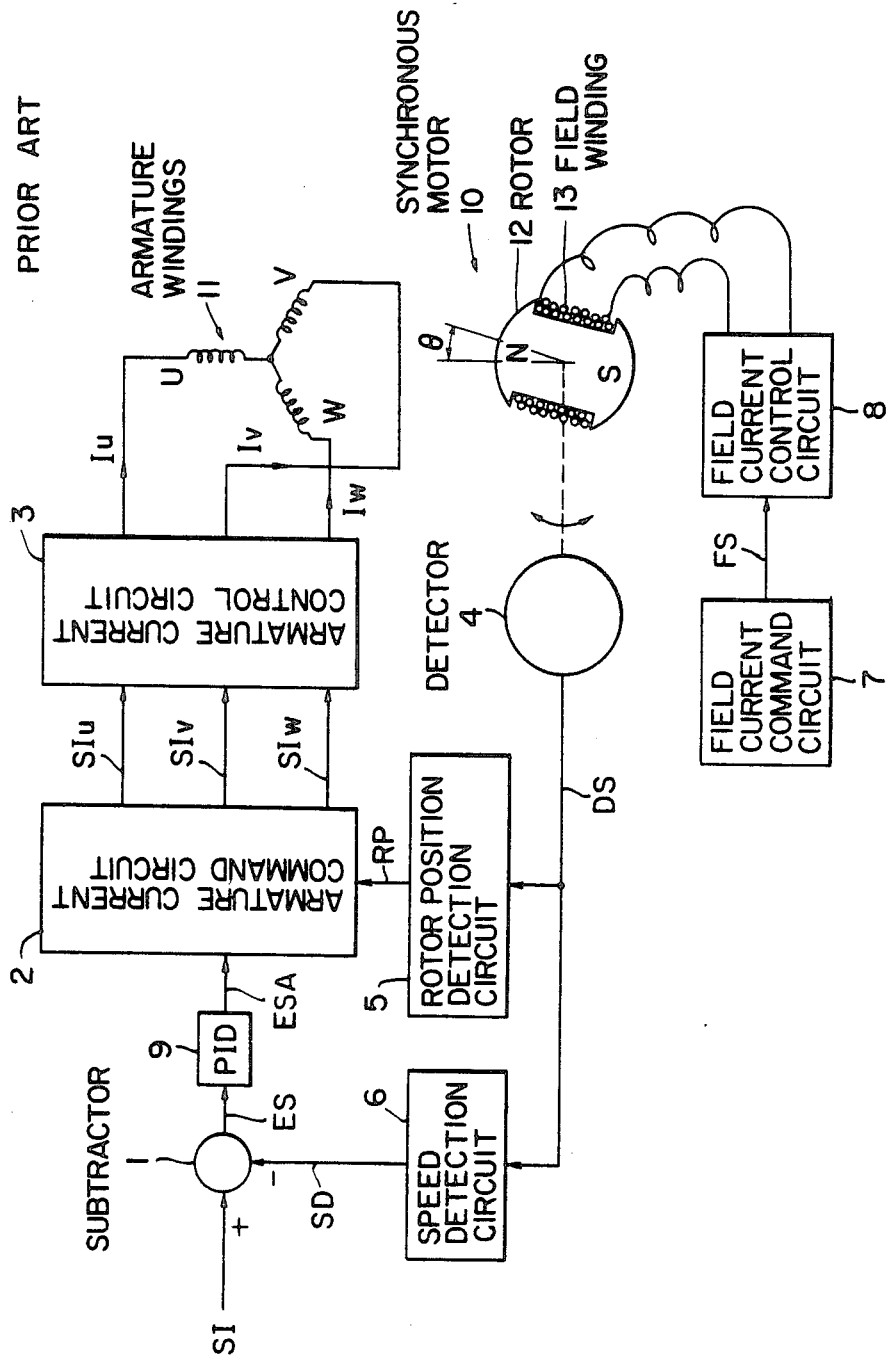
FIG. 1 is a block diagram showing an example of a prior art synchronous motor and a control unit therefor.
Figure 2:
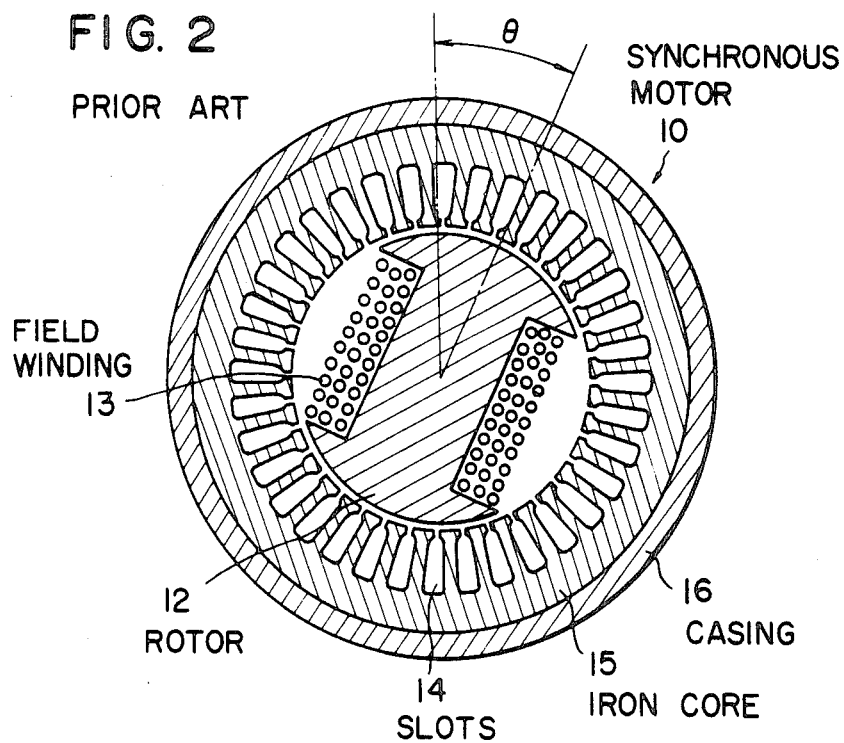
FIG. 2 is a view showing the structure of a prior art electromagnetic field type synchronous motor.
Figure 3:
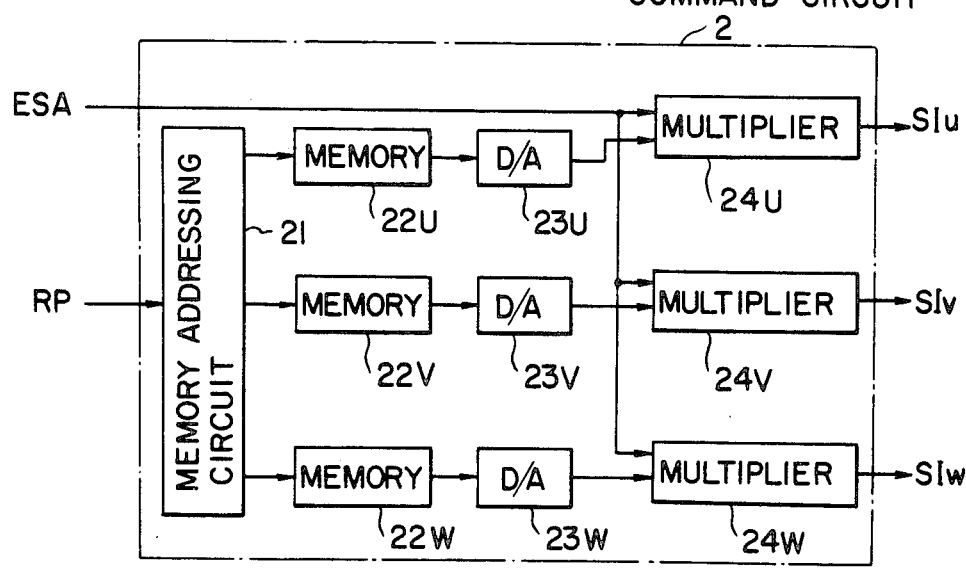
FIG. 3 is a circuit diagram showing a portion of FIG. 1 in further detail.
Figure 12:
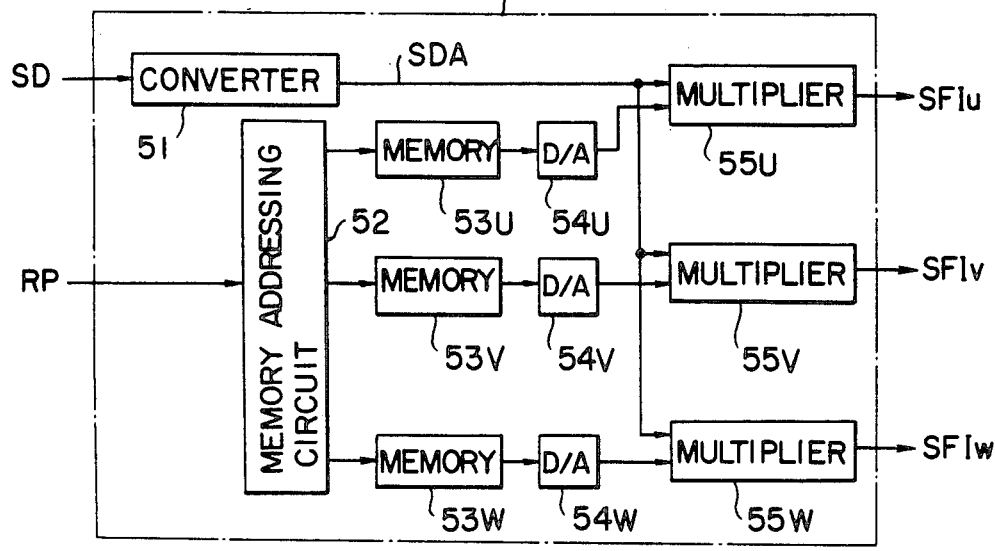
FIGS. 12 and 14 are block diagrams showing a portion of FIG. 11 in detail, respectively.
Figure 13:
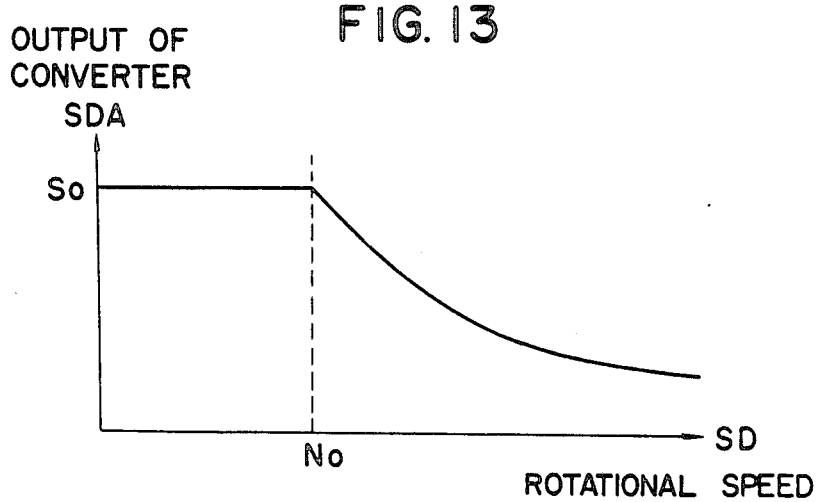
FIG. 13 is a graph showing the characteristics of the partial circuit shown in FIG. 12.

In the figure, the rotor 34 is connected to a detector 4 which detects the position and the rotational speed thereof. A rotor position signal RP from a rotor position detection circuit 5 is fed to an armature current command circuit 2 and a field current command circuit 50 so as to supply armature current commands $SAI_u$, $SAI_v$ and $SAI_w$ therefrom to the armature windings 31 via an armature current control circuit 40 as armature currents $AI_u$, $AI_v$ and $AI_w$. Field current commands $SFI_u$, $SFI_v$ and $SFI_w$ are supplied to the field windings 32 via the field current control circuit 60 as field currents $FI_u$, $FI_v$ and $FI_w$. The armature current command circuit 2 has the same structure as the one shown in FIG. 3. The field current command circuit 50 is shown in FIG. 12 in more detail wherein the speed signal SD from the speed detection circuit 6 is inputted in a converter 51 having characteristics as shown in FIG. 13 and the converted output SDA therefrom is inputted to multipliers 55U through 55W. More particularly, the converter 51 outputs a constant value $S_o$ when the input speed signal SD is less than a predetermined value $N_o$ while when it is larger than a predetermined value $N_o$, the output therefrom shows a reverse proportional curve which is expressed by SDA=1/SD. If the speed N of the rotor 34 is larger than the predetermined value $N_o$, since the field flux density B is counter-proportional to the field speed v, the inductive voltage V of the motor 30 becomes a constant value since $V = vBl \propto v \times (1/v) \times 1 = 1$. As a result, because the motor induced voltage V will not exceed a certain predetermined value even when the synchronous motor 30 rotates at a higher speed, the motor 30 can be controlled using a commercial power source so as to rotate at a higher rotational speed. When the field currents $FI_u$ through $FI_w$ are constant irrespective of the speed N of the motor 30, since the motor inductive voltage V is proportional to the speed N, the motor 30 cannot be controlled so as to rotate at a speed beyond that value normally obtainable by the use of the commercial power source.

Figure 14:
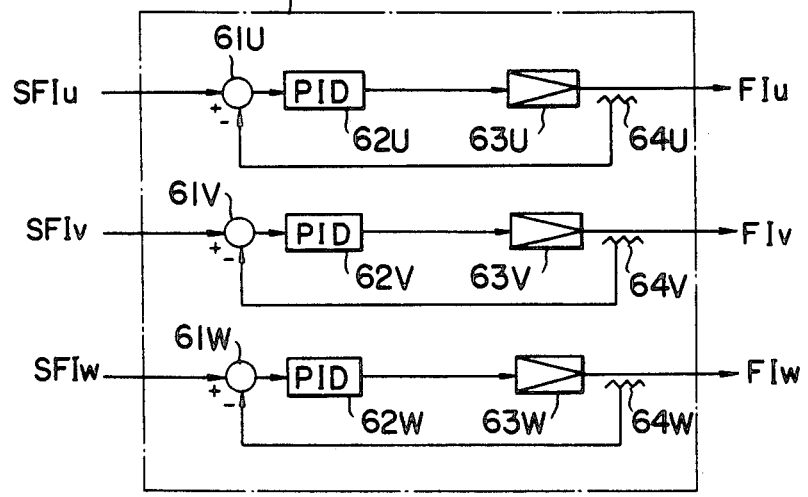

The rotor position signal RP from the rotor position detection circuit 5 is inputted to memory addressing circuit 52 such as mentioned above to read out sine-wave digital values stored in the memories 53U through 53W with address signals set by the memory addressing circuit 52. The digital values corresponding to the read-out rotor positions are converted to analog signals by D/A converters 54U through 54W and inputted to the multipliers 55U through 55W. The field current command circuit 50 is constructed so as to be similar to the aforementioned armature current command circuit 2 except for the converter 51. Since the armature current control circuit 40 and the field current control circuit 60 have the identical structure, a description will now be provided only on the structure of the field current control circuit 60 referring to FIG. 14. The field current commands $SFI_u$, $SFI_v$ and $SFI_w$ from the field current command circuit 50 are respectively inputted to subtractors 61U, 61V and 61W to be reduced by the feed back currents from converters 64U, 64V and 64W, and the resultant value is respectively inputted to PID amplifiers 62U, 62V and 62W. The amplified signals from the PID amplifiers 62U through 62W are further amplified by power amplifiers 63U through 63W so that the field currents $FI_u$, $FI_v$ and $FI_w$ thereof are supplied respectively to the field windings 32. Similarly, the armature currents $AI_u$ through $AI_w$ are controlled and amplified by the armature current control circuit 40 to be fed to the armature windings 31.

Operation of the aforementioned structure will now be described referring to the waveforms in FIG. 15A through FIG. 15G.

FIGS. 15A to 15G show the relationship between the rotational angle $\theta$ of the rotor 34, the field currents of the three-phases $FI_u$ through $FI_w$, the U-phase winding magnetic flux density $B_u$ at the position $\theta = 0$, and the 3-phase armature currents $AI_u$ through $AI_w$ when a constant motor torque is outputted. If the magnitude of the field flux which is rotated synchronously with the rotor 34 is constant, the field currents $FI_u$ through $FI_w$ will become as shown in FIGS. 15A through 15C or more particularly as expressed in the equation below:

$$\begin{aligned}
B &\propto I_u \sin\theta + I_v \sin\left(\theta - \tfrac{2}{3}\pi\right) + I_w \sin\left(\theta - \tfrac{4}{3}\pi\right) \\
&= I_o \sin\theta + \times \sin\theta + I_o \sin\left(\theta - \tfrac{2}{3}\pi\right) \times \\
&\quad \sin\left(\theta - \tfrac{2}{3}\pi\right) + I_o \sin\left(\theta - \tfrac{4}{3}\pi\right) \times \\
&\quad \sin\left(\theta - \tfrac{4}{3}\pi\right) \\
&= I_o \sin^2\theta + I_o\left\{\sin\theta \times \left(-\tfrac{1}{2}\right) - \cos\theta \times \tfrac{\sqrt{3}}{2}\right\}^2 + I_o\left\{\sin\theta \times \left(-\tfrac{1}{2}\right) - \cos\theta \times \left(-\tfrac{\sqrt{3}}{2}\right)\right\}^2 \\
&= I_o \sin^2\theta + I_o\left(\tfrac{1}{4}\sin^2\theta + \tfrac{2\sqrt{3}}{4}\sin\theta \times \cos\theta + \tfrac{3}{4}\cos^2\theta\right) + \\
&\quad I_o\left(\tfrac{1}{4}\sin^2\theta - \tfrac{2\sqrt{3}}{4}\sin\theta \times \cos\theta + \tfrac{3}{4}\cos^2\theta\right) \\
&= \tfrac{6}{4} I_o(\sin^2\theta + \cos^2\theta) = \tfrac{3}{2} I_o
\end{aligned} \qquad (3)$$

It is therefore obvious that even if the field windings 32 are provided on the side of the stator, the magnetic flux density B generated on the salient pole rotor 34 will be at a constant value. The magnetic flux density $B_u$ of a U-phase winding UAP at the position of $\theta = 0$ will become as shown in FIG. 15D. If the output torque T of the motor is constant, the armature currents $AI_u$, $AI_v$ and $AI_w$ will become respectively as shown in FIGS. 15E through 15G. Since the equations (1) and (2) hold, the motor output torque can be changed by varying the armature currents $AI_u$, $AI_v$ and $AI_w$.

The magnetomotive forces due to the armature current components $AI_u$, $AI_v$ and $AI_w$ cross perpendicularly to the magnetic polar direction of the salient-pole rotor 34. Since the magnetomotive force is controlled so as to act in the direction where magnetic resistance is large, the magnetic flux will not be greatly influenced by the armature current components $AI_u$, $AI_v$ and $AI_w$.

As a result, the synchronous motor 30 with the rotor of the salient-pole type shown in FIGS. 4 through 6 has substantially the same characteristics as the prior art synchronous motor of the electromagnetic field or permanent magnetic field type.

Figure 16:
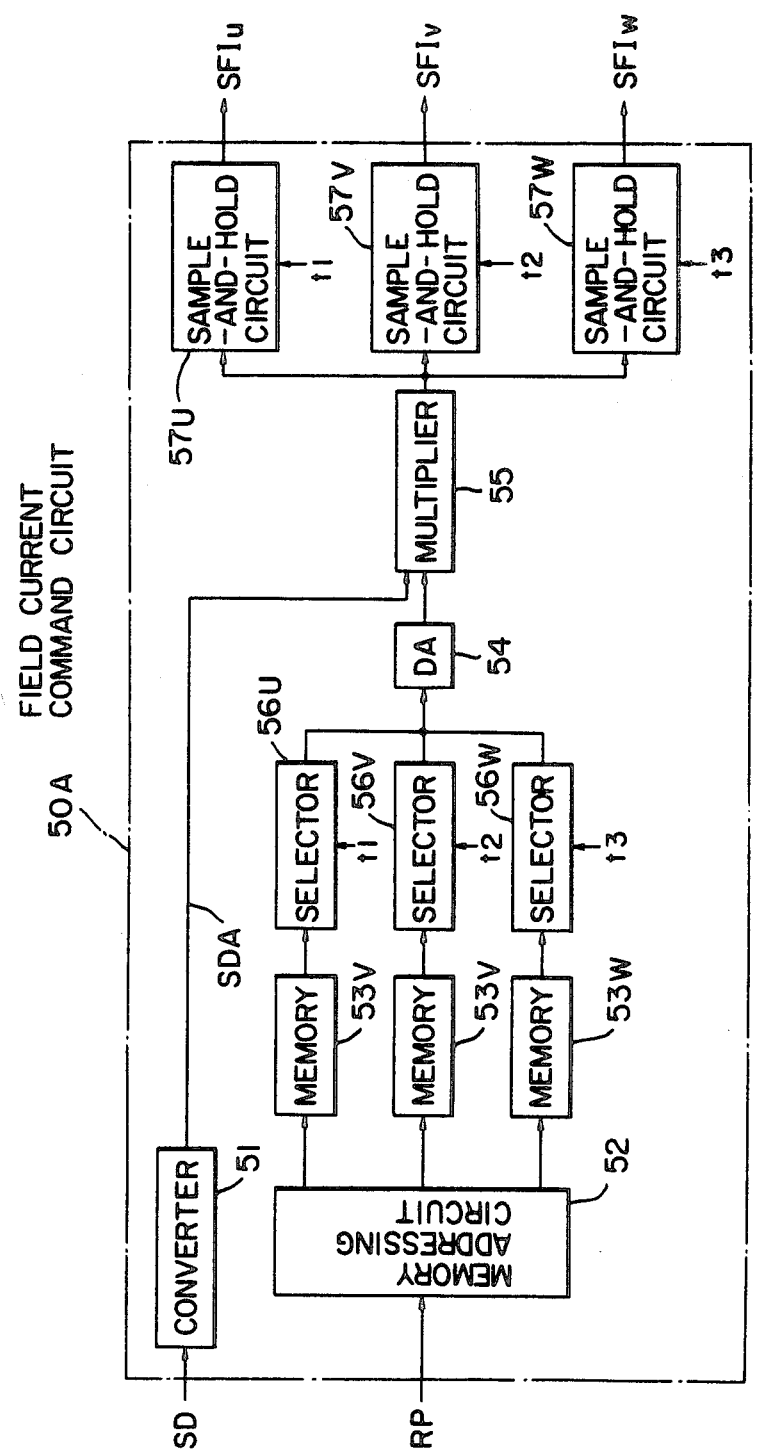
FIG. 16 is a partial block diagram showing another embodiment of the control unit according to this invention.

The armature current command circuit 2 and the field current command circuit 50 are processed in parallel for each phase, but they may be processed in series by time sharing. FIG. 16 shows an embodiment thereof in the form of a field current command circuit 50A. An armature current command circuit may be constructed in the same manner. More particularly, the sine-wave data read out by the memories 53U through 53W are respectively inputted to selectors 56U through 56W, and are outputted by timing signals t1 through t3 in a time sharing process. The sine-wave data output at the timing alone are converted to analog signals by a D/A converter 54. The signal from the D/A converter 54 is multiplied by converted output SDA from the converter 51 by the multiplier 55 and the result is inputted to the sample-and-hold circuits 57U through 57W. Since the sample-and-hold circuits 57U through 57W are switched with the timing signals t1 through t3, a selected one of the sample-and-hold circuits 57U through 57W outputs a field current command SFI. By consecutively inputting timing signals t1 through t3, field current commands $SFI_u$ through $SFI_w$ can consecutively be obtained. For example, when a timing signal t1 is being outputted, a U-phase field current command $SFI_u$ is obtained corresponding to the content of the memory 53U. When a timing signal t2 being outputted, a V-phase field current command $SFI_v$ is obtained corresponding to the content of the memory 53V. When a timing signal t3 is being outputted, a W-phase field current command $SFI_w$ is obtained corresponding to the memory 53W. Accordingly, the field current commands $SFI_u$ through $SFI_w$, which are similar to the case in which signals are processed in parallel, are obtained by switching timing signals t1 through t3 at a higher speed.

Since D/A converters of the multiplication type are easily available in recent years, such two functions can be realized in one DA converter of this type. The armature current waveform is described only in sine-waves in the foregoing statement, but the similar effect can be achieved in other waveforms which approxiate sine-waves, for instance, trapezoidal waves.

Although the synchronous motor 30 has a stator wound with armature windings and field windings, the stator may be wound with windings for common use of the armature and the field.

Figure 17:
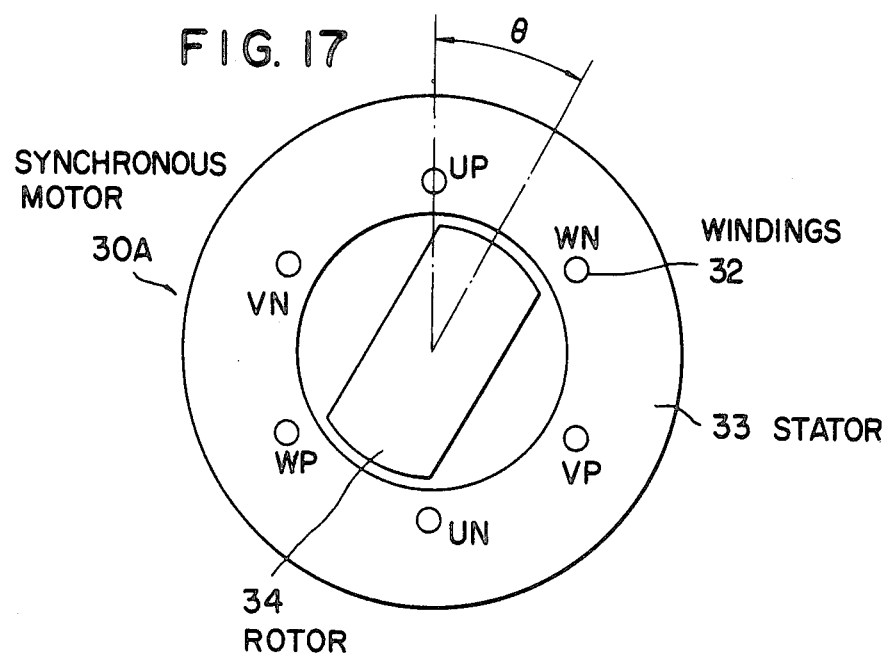
FIG. 17 is a schematic view showing the structure of another embodiment of a synchronous motor according to this invention.
Figure 18:
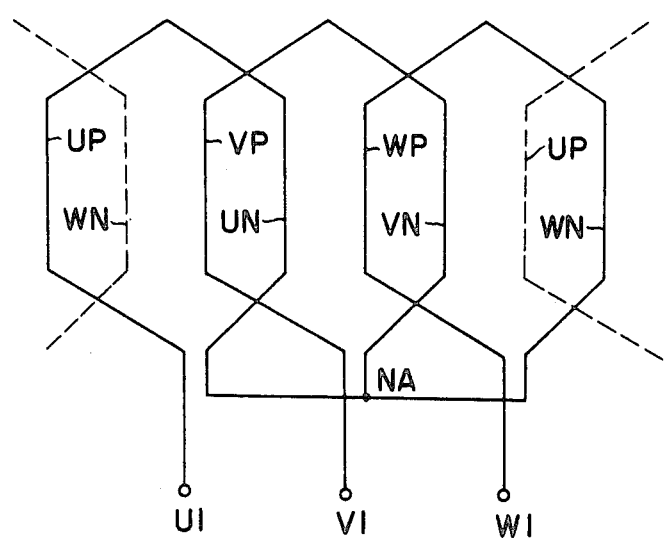
FIG. 18 is a view showing the state of the windings of FIG. 17.

FIG. 17 shows an embodiment of the synchronous motor 30A having a concentrated winding wherein a stator 33 is wound with a 3-phase windings 32 which functions as both an armature and a field winding. A bipolar rotor 34 of the salient-pole type as mentioned above comprising a magnetic material is provided in the space inside the stator 33. The windings 32 are wound in a manner shown in FIG. 18; the U-phase winding of the windings 32 is connected from an input terminal U1 to a connection NA via windings UP and UN, the V-phase winding is connected from an input terminal V1 to the connection NA via windings VP and VN, and W-phase winding is connected from an input terminal W1 to the connection NA via windings WP and WN. Although the windings 32 are formed in a concentrated form in the above description for the purpose of facilitating understanding, they may be in the form of winding. The rotor 34 in this case has the same structure as the one shown in FIG. 6, but may be modified as shown in FIGS. 7 through 10.

A control unit according to this invention which controls a synchronous motor of the aforementioned type will now be described referring to FIG. 19. The rotor 34 is connected to a detector 4 which detects the position and rotational speed of the rotor. The rotor is adapted so that a rotor position signal RP from the rotor position detection circuit 5 is inputted to an armature current command circuit 2 and a field current command circuit 50; armature current commands $SAI_u$, $SAI_v$ and $SAI_w$ from the command circuit 2 are added to field current commands $SFI_u$, $SFI_v$ and $SFI_w$ from the circuit 50 by adders 72, 73 and 74, respectively; the sums of the currents are fed as current commands $SI_u$, $SI_v$ and $SI_w$ to a current control circuit 200, and then are supplied as driving currents $I_u$ $(=FI_u+AI_u)$, $I_v$ $(=FI_v+AI_v)$ and $I_w$ $(=FI_w+AI_w)$ to windings 32. The above armature current command circuit 2 has the same structure as the one shown in FIG. 3 while the file current command circuit 50 has the same structure as the one shown in FIG. 12.

Figure 20:
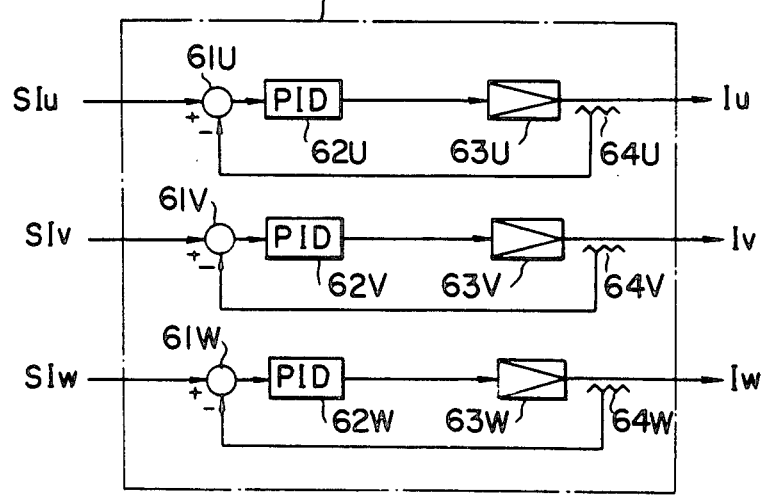
FIG. 20 is a block diagram showing a portion of FIG. 19 in detail.

The current control circuit 200 has a structure shown in FIG. 20 wherein the sums of currents $SI_u$, $SI_v$ and $SI_w$ of the armature current commands $SAI_u$, $SAI_v$ and $SAI_w$ from the command circuit 2 and the field current commands $SFI_u$, $SFI_v$ and $SFI_w$ from the command circuit 50 are respectively inputted to subtractors 61U, 61V and 61W to be reduced by feedback currents from current transformers 64U, 64V and 64W and the resultant values thereof are inputted to PID amplifiers 62U, 62V and 62W. Amplified signals from the PID amplifiers 62U through 62W are amplified by power amplifiers 63U through 63W respectively, and the amplified currents $I_u$, $I_v$ and $I_w$ therefrom are respectively supplied to the motor windings 32.

The operation of the structure such as the one mentioned above will now be described by referring to the waveform charts of FIGS. 21A through 21G and the timing charts of FIGS. 22A through 22D.

Figure 21A:
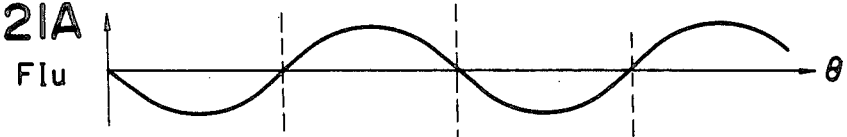
FIGS. 21A through 21G are waveform charts showing examples of the operation of FIG. 19, respectively.
Figure 21B:
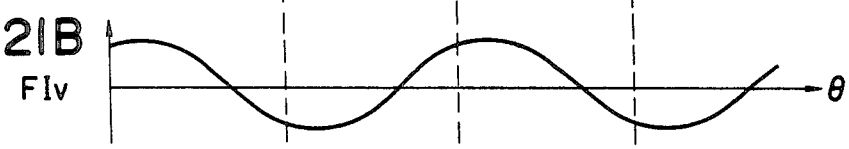
Figure 21C:
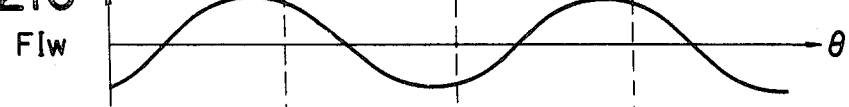

FIGS. 21A to 21G show the relationships between the rotational angle $\theta$ of the rotor 34, components $FI_u$ through $FI_w$ of the driving currents $I_u$ through $I_w$ corresponding to the 3-phase currents $SFI_u$ through $SFI_w$, the magnetic flux density $B_u$ of the U-phase winding at the position $\theta=0$, and components $AI_u$ through $AI_w$ of the driving currents $I_u$ through $I_w$ corresponding to the 3-phase armature current commands $SAI_u$, through $SAI_w$. If it is assumed that the field magnetic flux component which rotates synchronously with the rotor 34 is constant in magnitude, the field current components $FI_u$, $FI_v$ and $FI_w$ will become as shown in FIGS. 21A through 21C. More precisely, an equation similar to the equation (3) holds.

$$\begin{aligned}
B &\propto I_{uf}\sin\theta + I_{vf}\sin\left(\theta - \frac{2}{3}\pi\right) + I_{wf}\sin\left(\theta - \frac{4}{3}\pi\right) \\
&= I_o\sin\theta \times \sin\theta + I_o\sin\left(\theta - \frac{2}{3}\pi\right) \times \\
&\quad \sin\left(\theta - \frac{2}{3}\pi\right) + I_o\sin\left(\theta - \frac{4}{3}\pi\right) \times \\
&\quad \sin\left(\theta - \frac{4}{3}\pi\right) \\
&= I_o\sin^2\theta + I_o\left(\sin\theta \times \left(-\frac{1}{2}\right) - \cos\theta \times \frac{\sqrt{3}}{2}\right)^2 + I_o\left(\sin\theta \times \left(-\frac{1}{2}\right) - \cos\theta \times \left(-\frac{\sqrt{3}}{2}\right)\right)^2 \\
&= I_o\sin^2\theta + I_o\left(\frac{1}{4}\sin^2\theta + \frac{2\sqrt{3}}{4}\sin\theta \times \cos\theta + \frac{3}{4}\cos^2\theta\right) + \\
&\quad I_o\left(\frac{1}{4}\sin^2\theta - \frac{2\sqrt{3}}{4}\sin\theta \times \cos\theta + \frac{3}{4}\cos^2\theta\right) \\
&= \frac{6}{4}I_o(\sin^2\theta + \cos^2\theta) = \frac{3}{2}I_o
\end{aligned} \quad (4)$$

Figure 21D:
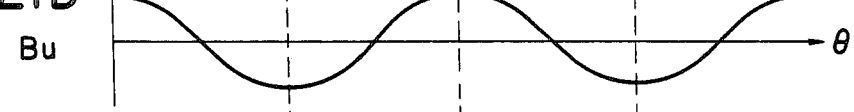
Figure 21E:
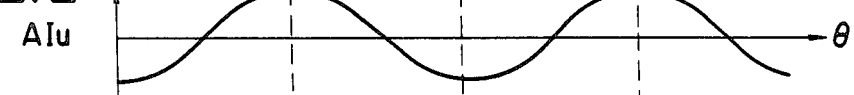
Figure 21F:
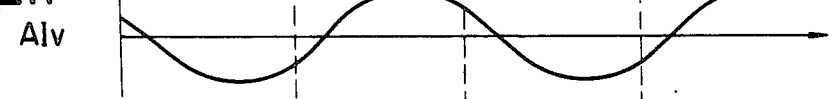
Figure 21G:
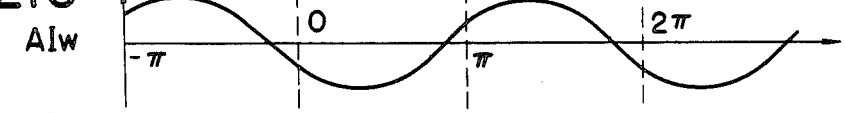

Therefore, it is obvious that even if windings 32 which double as a field winding are provided on the side of the stator, the magnetic flux density B generated on a salient-pole type rotor 34 will assume a constant value. The magnetic flux density $B_u$ of the U-phase winding UP will become as shown in FIG. 21D. If the output torque T of the motor is constant, the components $AI_u$, $AI_v$ and $AI_w$ of the armature current will be as shown in FIGS. 21E through 21G. Since said equations (1) and (2) hold, the motor output torque T can be changed by simply varying the magnitudes of the armature current commands $SAI_u$, $SAI_v$ and $SAI_w$ corresponding to the armature current components $AI_u$, $AI_v$ and $AI_w$. The magnetomotive force by the armature current components $AI_u$, $AI_v$ and $AI_w$ crosses perpendicularly to the magnetic polar direction of the salient-pole type rotor 34 and is controlled so as to act in the direction where the magnetic resistance is greater. The magnetic flux therefore will not be greated affected by the armature current components $AI_u$, $AI_v$ and $AI_w$, respectively. Consequently, the synchronous motor of the salient-pole type rotor shown in FIGS. 17 and 18 will have characteristics substantially similar to a prior art synchronous motor of the electromagnetic field type or a permanent magnet field type.

Figure 22A:
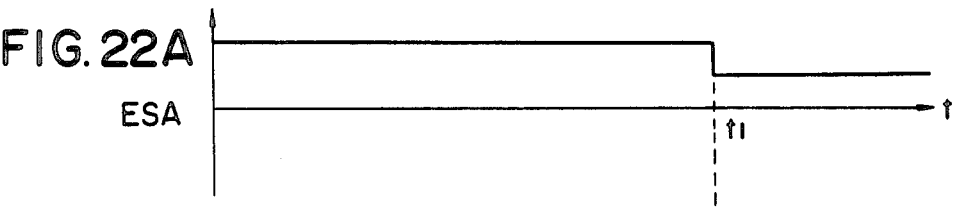
FIGS. 22A through 22D are timing charts showing operational examples of the unit shown in FIG. 19, respectively.
Figure 22B:
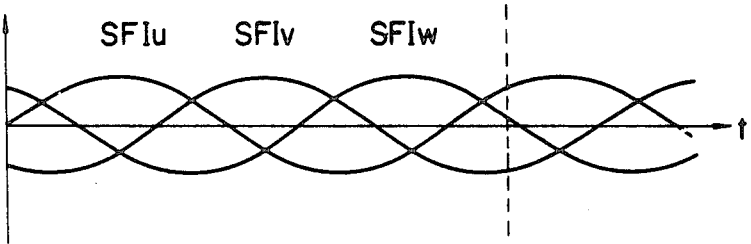
Figure 22C:
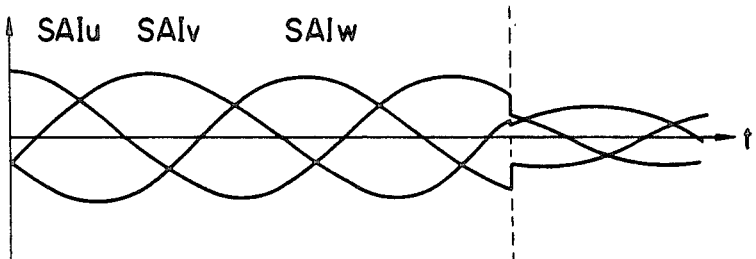
Figure 22D:
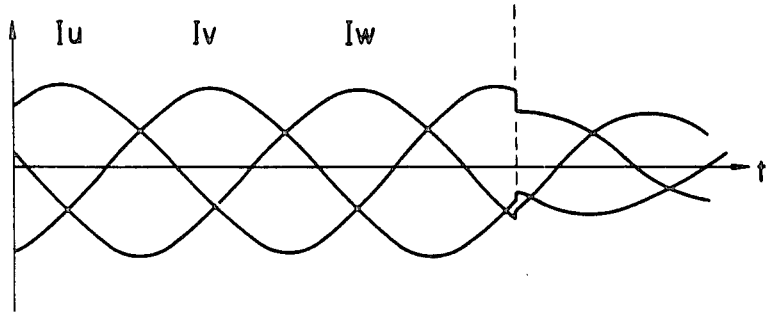

FIG. 22A through FIG. 22D show the timing charts of the main parts of the present invention. As a torque command ESA from the PID compensating circuit 9 decreases at the time point t1 as shown in FIG. 22A, the armature current commands $SAI_u$ through $SAI_w$ from the armature current command circit 2 will be lowered to a level at the time point t1 and thereafter to a level as shown in FIG. 22C. The field current commands $SFI_u$ through $SFI_w$ from the field current command circuit 50 do not change so as to correspond to the change in the torque command ESA as shown in FIG. 22B. However, since the driving currents $I_u$ through $I_w$ from the current 13 and the result of the multiplication is outputted as the field current commands $SFI_u$ through $SFI_w$. By this arrangement, all the operations can be processed in analog an analog fashion.

Figure 25:
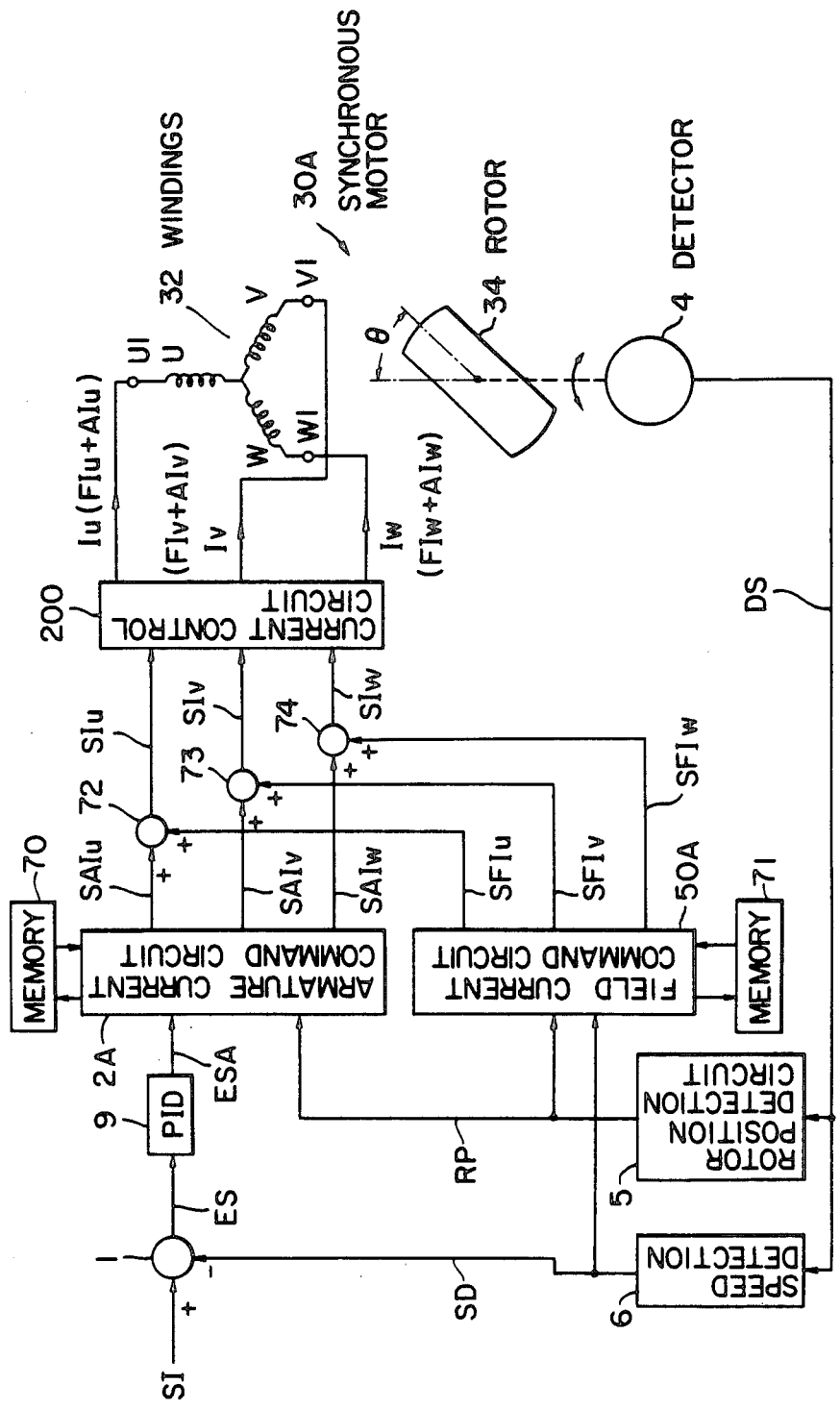
FIGS. 25 and 26 are block diagrams of other embodiments of the synchronous motor and the control unit therefor according to this invention, respectively.

Another embodiment of a control unit for the synchronous motor 30A is described below referring to FIG. 25. FIG. 25 shows a control unit comprising a memory table 70 which stores armature current commands $SAI_u$ through $SAI_w$ in a table, and a memory table 71 which stores field current commands $SFI_u$ through $SFI_w$ in a table. The armature current command circuit 2A reads out armature current commands $SAI_u$ through $SAI_w$ from the memory table 70 and outputs the same at a predetermined timing based upon the torque command EAS and the rotor position signal RP while the field current command circuit 50A reads out field current commands $SFI_u$ through $SFI_w$ from the memory table 71 at a predetermined timing based upon the speed signal SD and the rotor position signal RP. Since the armature current and the field current are stored in memory tables, and the armature current commands $SAI_u$ through $SAI_w$ are outputted by the torque command ESA and the rotor position signal PR while the field current signals $SFI_u$ through $SFI_w$ are outputted by the speed signal SD and the rotor position signal RP ($\theta$), this unit can easily achieve not only linear control but also non-linear control.

Figure 26:
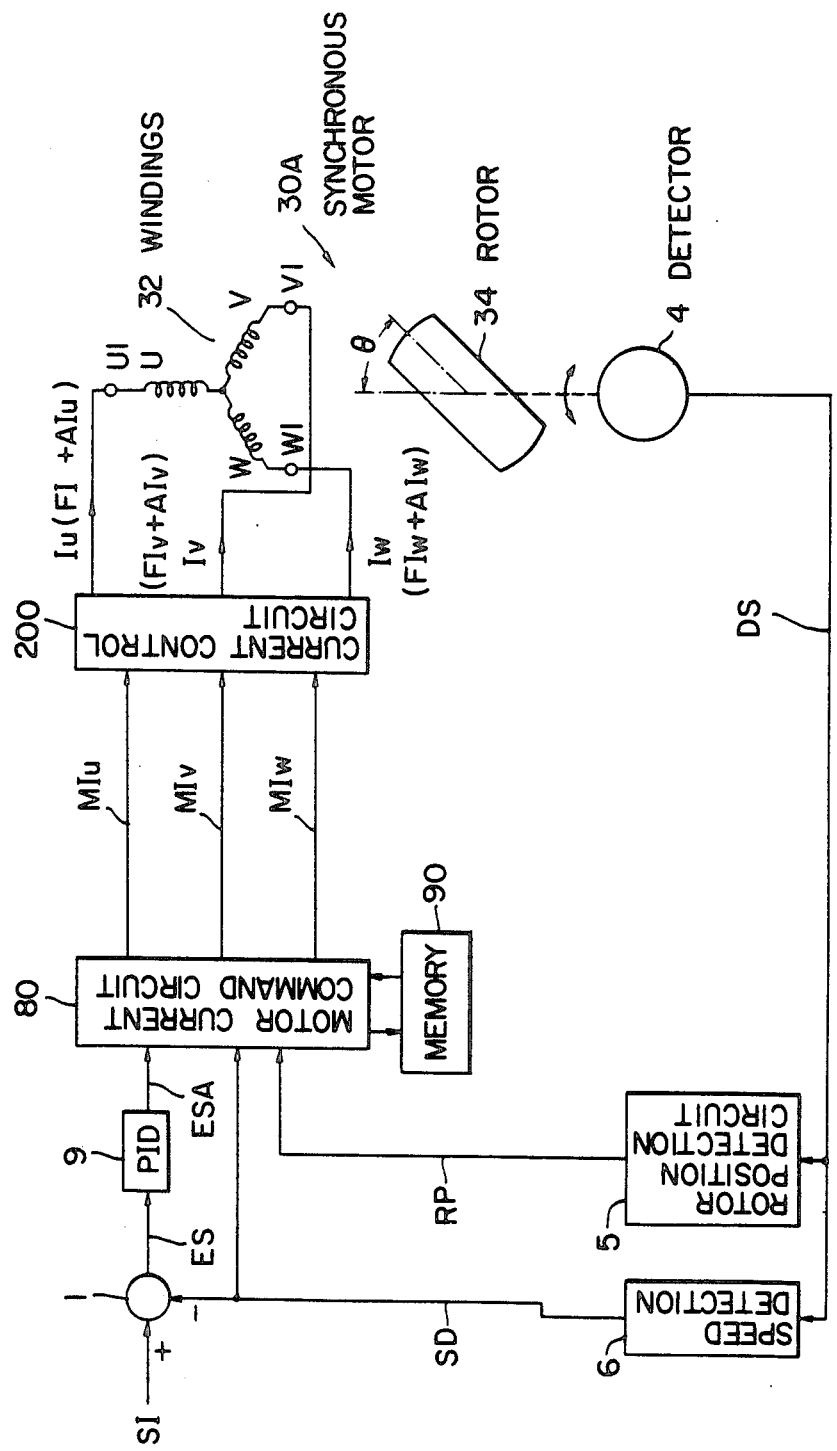
Figure 27:
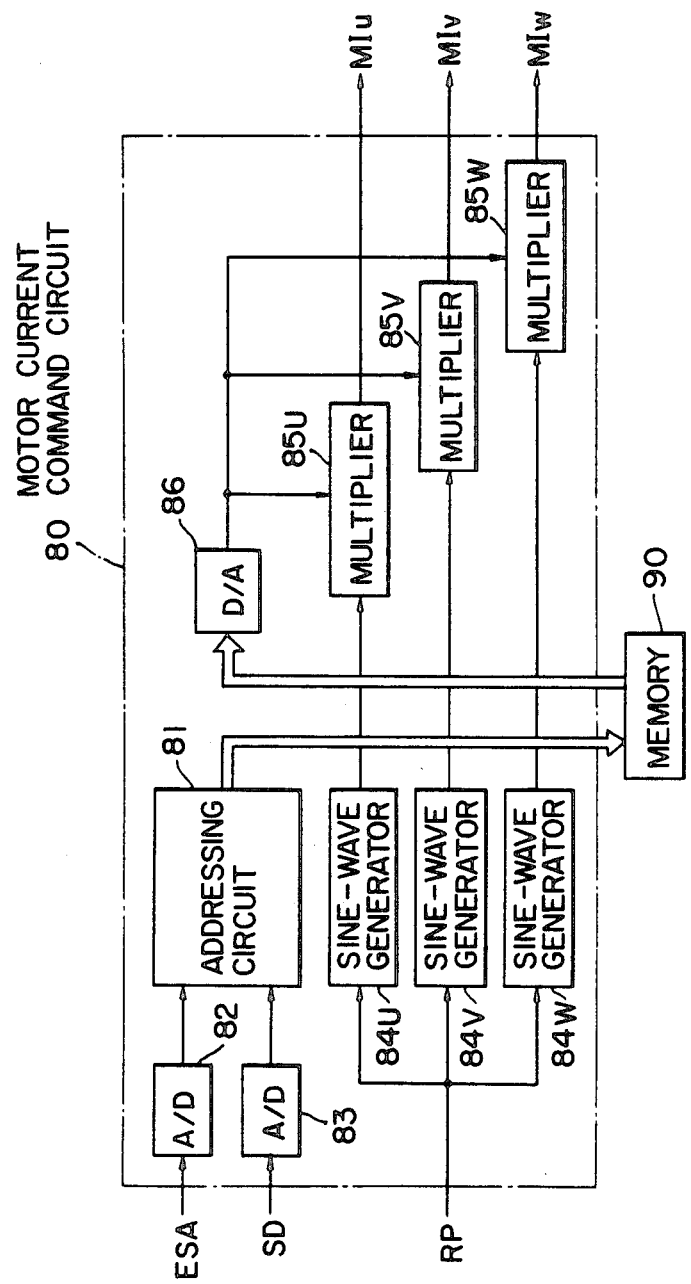
FIGS. 27 and 28 are block diagrams showing other embodiments of the synchronous motor current command circuit, respectively.
Figure 28:
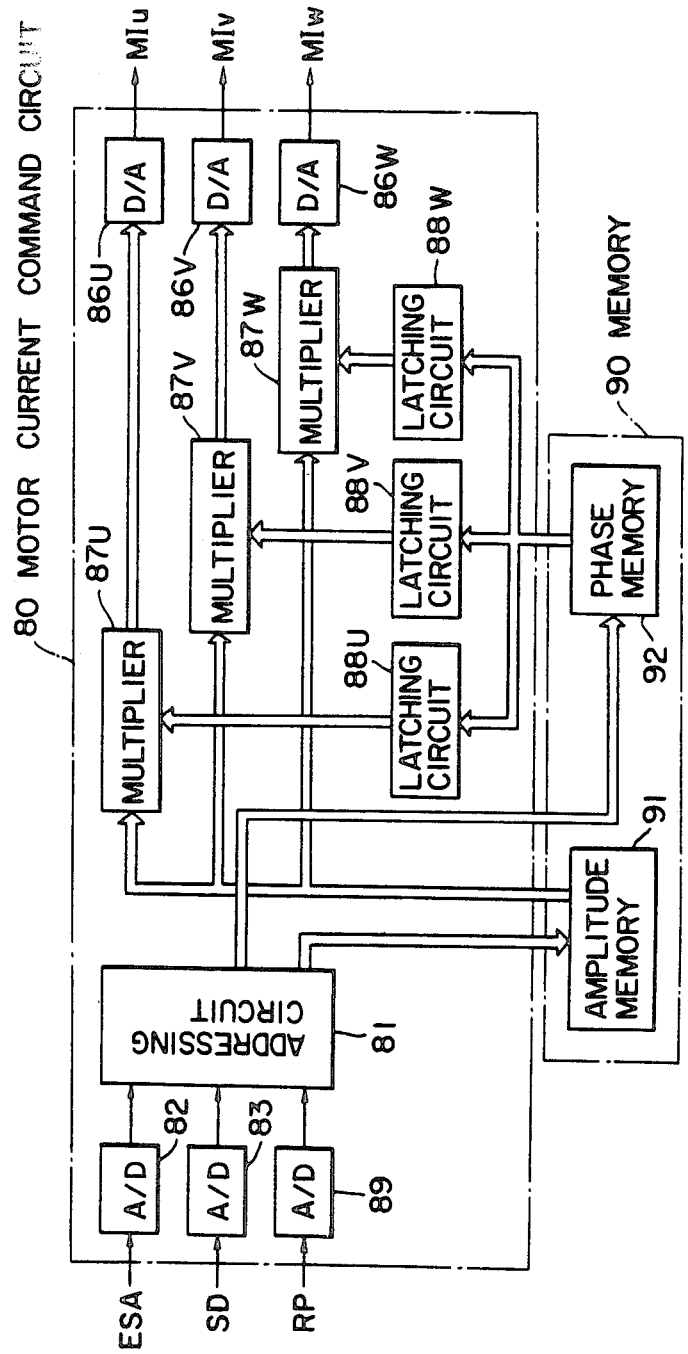

FIG. 26 shows another embodiment wherein the motor current commands $MI_u$ through $MI_w$ which are inputted to the current control unit 200 are formed by a motor current command circuit 80 and a memory 90. FIGS. 27 and 28 show the same embodiment in more control circuit 200 which are obtained by adding the armature current commands $SAI_u$ through $SAI_w$ and the field current commands $SFI_u$ through $SFI_w$ will change before being supplied to the windings 32, the driving torque of the synchronous motor 30A is varied so as to correspond to the torque command ESA.

Although the armature current command circuit 2 and the field current command circuit 50 in the control unit are structured with digital circuits using memories in the above statement, they may be structured with analog circuits using function generators. FIG. 23 shows another embodiment of the armature current command circuit 2 which comprises a sine-wave generator 25U which generates a sine-wave signal $\sin \theta$ corresponding to a position signal RP ($\theta$) from the rotor position detection circuit 5, a sine-wave generator 25V which generates signal $\sin (\theta + \frac{2}{3}\pi)$ having a phase which deviates by $\frac{2}{3}\pi$, and a sine-wave generator 25W which generates a sine-wave signal sin $$\left(\theta + \frac{4}{3}\pi\right)$$

having a phase which deviates by $(4/3)\pi$. In such an arrangement, sine-wave signals from the sine-wave generators 25U through 25W are respectively inputted to multipliers 24U through 24W, multiplied by the torque command ESA in an analog fashion, and the result of the multiplication will be outputted as armature current commands $SAI_u$ through $SAI_w$. In this manner, all of the operations can be processed in an analog fashion. FIG. 24 shows another embodiment of the field current command circuit 50 wherein a rotor position signal RP($\theta$) from the rotor position detection circuit 5 is subtracted by $\pi/2$ in a subtractor 56, the difference $$\left(\theta - \frac{\pi}{2}\right)$$

is inputted respectively to sine-wave generators 57U through 57W, and sine-wave signal sin $$\left(\theta - \frac{\pi}{2}\right)$$

is outputted from the sine-wave generator 57U, and a sine-wave signal $$\left(\theta - \frac{\pi}{2} + \frac{2}{3}\pi\right)$$

is outputted from the sine-wave generator 57V and a sine-wave signal sin $$\left(\theta - \frac{\pi}{2} + \frac{4}{3}\pi\right)$$

is outputted from the sine-wave generator 57W. These sine-wave signals are inputted to multipliers 55U through 55W together with speed signals SDA from the converter 51 having the characteristics shown in FIG.

detail, respectively. The address of the memory 90 is set by the torque command ESA and the speed signal SD and sine-wave generators 84U through 84W generate sine-waves in a phase deviation relationship corresponding to the rotor position signal RP ($\theta$) in FIG. 27. The data read out of the memory 90 is converted to analog signals by a D/A converter 86, and inputted to multipliers 85U through 85W to be multiplied by sine-wave signals from the sine-wave generators 84U through 84W, respectively, thereby forming armature current commands $MI_u$ through $MI_w$. FIG. 28 shows an embodiment wherein the content of the memory 90 is divided into an amplitude memory 91 and a phase memory 92. The amplitude memory 91 and phase memory 92 are addressed by an addressing circuit 81 which receives as input the torque command ESA, and the speed signal SD and the rotor position signal RP. The amplitude data from the memory 91 is inputted to multipliers 87U through 87W while the phase data from the phase memory 92 is temporarily latched in latching circuits 88U through 88W and then controlled in timing to be inputted to multipliers 87U through 87W. The results of the multiplications of the multipliers 87U through 87W are respectively converted to analog values by D/A converters 86U through 86W and are outputted as the motor current commands $MI_u$ through $MI_w$.

Figure 29:
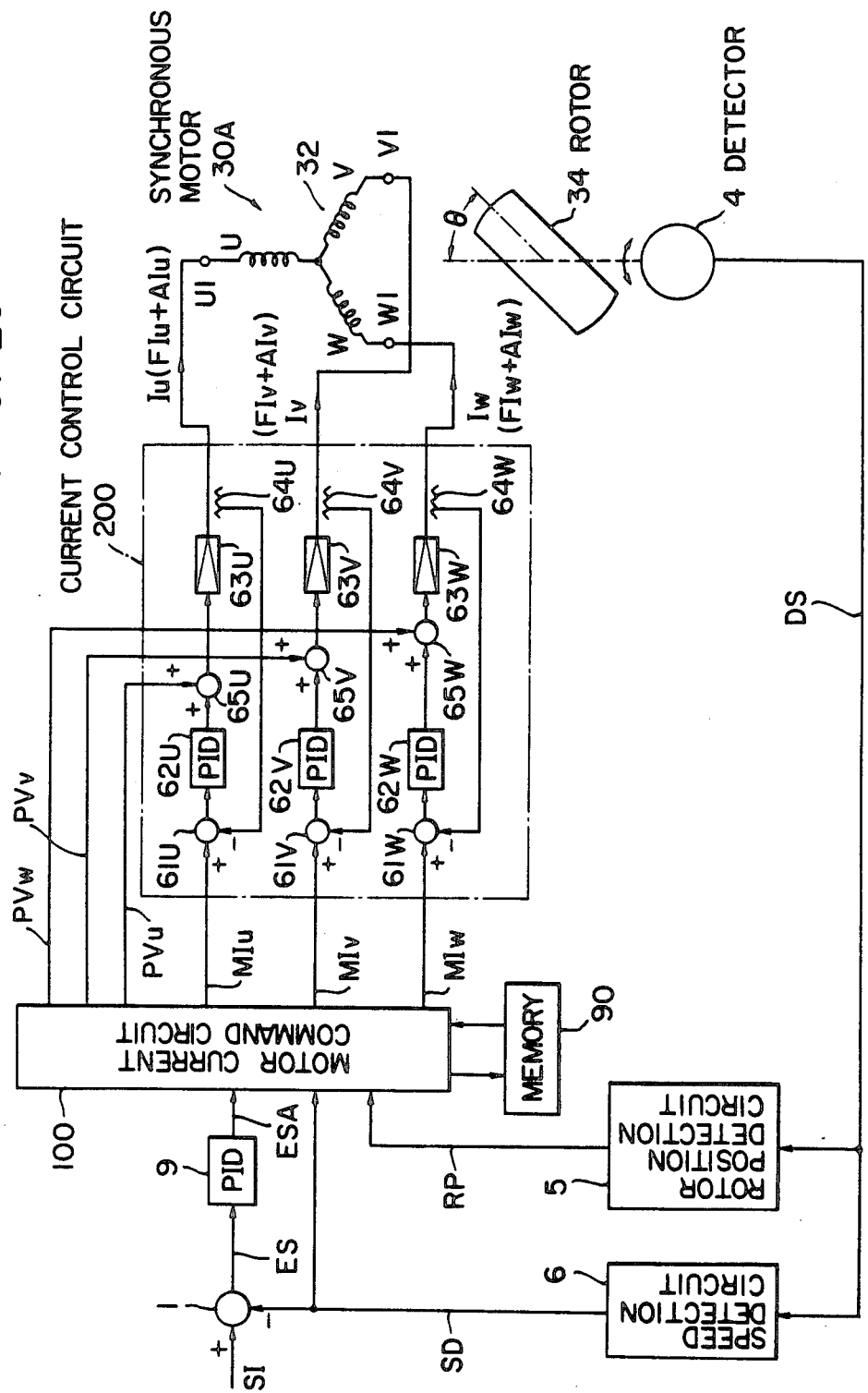
FIG. 29 is a block diagram showing still another embodiment of the synchronous motor and the control unit therefor of this invention.
Figure 30:
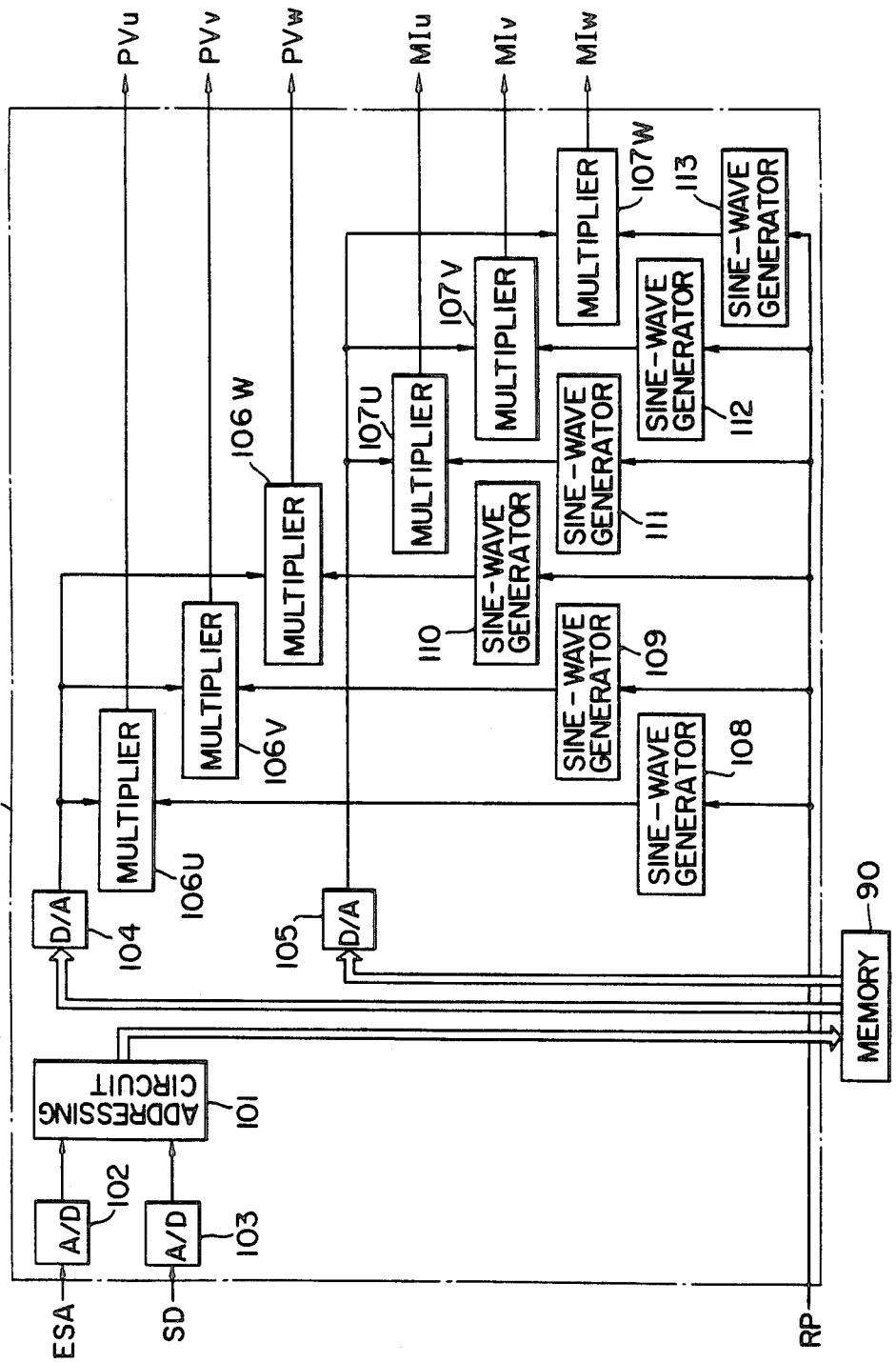
FIG. 30 is a block diagram showing another embodiment of the synchronous motor current command circuit.

In FIG. 29, the motor current command circuit 100 generates 3-phase voltages $PV_u$ through $PV_w$ of the motor besides motor current commands $MI_u$ through $MI_w$. The 3-phase voltages $PV_u$ through $PV_w$ are added to adders 65U through 65W in the current control circuit 200. FIG. 30 shows the motor current command 100 in more detail. The memory 90 is accessed by an addressing circuit 101 based upon the torque command ESA and the speed signal SD and the 3-phase voltage data read out of the memory 90 is converted to analog signals by a D/A converter 104 and inputted to multipliers 106U through 106W while the current command data read out of the memory 90 is converted to analog signals by a D/A converter 105 and inputted to multipliers 107U through 107W. The rotor position signal RP is inputted to sine-wave generators 108 through 113, and converted to sine-wave signals corresponding to the U through W phases, and inputted to multipliers 106U through 106W and 107U through 107W respectively while the motor current commands $MI_u$ through $MI_w$ are outputted from the multipliers 107U through 107W and the 3-phase voltages $PV_u$ through $PV_w$ are outputted from the multipliers 106U through 106W.

In each of the above mentioned embodiments, the unit is controlled by the hardware configuration, but it may be controlled by the software of a computer system.

As stated above, the synchronous motors according to this invention have a rotor which is structured with a salient-pole type magnetic material. The synchronous motors therefore do not need to supply electrical current via slip rings or the like. Since no mechanical contact is involved, the reliability of the motor can be enhanced. Since the field windings are wound around a stator, the heat generated from the field winding can easily be radiated, thereby realizing a compact motor. Moreover, since the field windings are wound around a stator, there is no centrifugal force generated as if they are wound on the side of the rotor, thereby simplifying the fixing of windings. Further, more since there is no necessity of using an expensive permanent magnet as a rotor, it becomes possible to obtain a simple-structure and low-priced motor with a larger capacity.

Accordingly, the control unit according to this invention can control the aforementioned novel synchronous motor, thereby achieving the aforementioned advantageous effects which have not heretofore been attained.

It will be apparent that many modifications and adaptations of the invention will become apparent to those skilled in the art and it is intended to encompass such obvious modifications and changes in the scope of the claims appended hereto.

What is claimed is:

1. A synchronous motor and a control system therefor, which comprises:

a three-phase synchronous motor which has a stator having windings and a rotor which is winding-free, said stator being of a right circular cylindrical shape so as to have a transverse section which is circular; said stator having slots which are symmetrically provided in an inner circular side thereof and having armature windings and field windings which are wound around said slots independently from each other and have symmetrical three-phase windings; said rotor comprising a salient-pole structure having a plurality of magnetic poles and composed of a magnetic material; the number of magnetic poles being equal to twice that of a positive integer; and a control system comprising a rotor position detection means for detecting a position of said rotor; a speed detection means for detecting a rotational speed of said rotor; a PID compensation means for compensating for a deviation between a speed command input and a speed signal detected by said speed detection means; an armature current command means for receiving a compensated speed command from said PID compensation means and a position signal detected by said rotor position detection means as an input and for generating a three-phase armature current command in response thereto; a field current command means for receiving said detected speed and position signals as inputs thereto and for generating a three-phase field current command in response thereto; an armature current control means for receiving said armature current command as an input thereto and for supplying armature current to said armature windings in response thereto; and a field current control means for receiving said field current control command as an input thereto and for supplying field current to said field windings in response thereto.

2. A synchronous motor and a control system therefor as recited in claim 1, wherein tips of said magnetic poles have a plurality of holes which are bored in a rotational direction of said motor and are aligned in an axial direction of said tips of said magnetic poles.

3. A synchronous motor and a control system therefor as recited in claim 1, wherein tips of said magnetic poles have a plurality of holes which are bored in an axial direction of said motor and are aligned in a rotational direction of said tips of said magnetic poles.

4. A synchronous motor and a control system therefor as recited in claim 2, wherein said holes are formed in a rectangular or round shape.

5. A synchronous motor and a control system therefor as recited in claim 1, wherein said armature current command means comprises: a memory for storing sine-wave data of said armature windings; a memory addressing circuit for setting addresses for readout out sine-wave data from said memory corresponding to said detected position; a D/A converter for converting sine-wave data read out from said memory to analog signals; and a multiplier means for receiving said analog signals as input thereto and for multiplying them by said speed deviation.

6. A synchronous motor and a control system therefor as recited in claim 1, wherein said field current command means comprises: a memory for storing sine-wave data of said armature windings; a memory addressing circuit for setting addresses for reading out sine-wave data form said memory corresponding to said detected position; a D/A converter for converting read out sine-wave data from said memory into analog signals; and a multiplier means for receiving said analog signals as input thereto and for multiplying them by said analog signal output from said D/A converter.

7. A synchronous motor and a control system therefor as recited in claim 1, wherein said field current command means comprises: a memory for storing sine-wave data of said armature windings; a memory addressing circuit for setting addresses for reading out sine-wave data from said memory correspondingly to said detected position; a selector for switching the timing of sine-wave data read out from said memory; a D/A converter for converting outputs from said selector into analog signals; a converter means for converting said detected speed to a converted output in response to a predetermined function; a multiplier means for receiving said analog signals as input and for multiplying them by said output from said converter; and a sample-and-hold circuit for switching the timing of a result of said multiplication by said multiplier means and for outputting said result.

8. A synchronous motor and a control system therefor as recited in claim 6, wherein said predetermined function of said converter comprises a constant value function until a predetermined speed value is reached, and comprises an inversely proportional function beyond said predetermined speed value.

9. A synchronous motor and a control system therefor which comprises:
- a three-phase synchronous motor which has a stator having windings and rotor which is winding-free, said stator being of a right circular cylindrical shape so as to have a transverse section which is circular; said stator having slots which are symmetrically provided in an inner circular side thereof and having a pair of three-phase windings which allow a synthesized electrical current to be used as an armature current and field current and having radially symmetrical three-phase windings which are wound around said slots; said rotor comprising a salient-pole structure having a plurality of magnetic poles and composed of a magnetic material, the number of magnetic poles being equal to twice that of a positive integer; and
- a control system comprising a rotor position detection means for detecting a position of said rotor; a speed detection means for detecting a rotational speed of said rotor; a PID compensation means for compensating for a deviation between a speed command input and a speed signal detected by said speed detection means; an armature current command means for receiving a compensated speed command from said PID compensation means and a position signal detected by said rotor position detection means as an input and for generating a three-phase armature current command in response thereto; a field current command means for receiving said detected speed and position signals are inputs thereto and for generating a three-phase field current command in response thereto; an adding means for respectively adding said three-phase armature current command and said three-phase field current command; and a current control means for receiving signals added by said adding means and for supplying current to said windings in response thereto.

10. A synchronous motor and a control system therefor as recited in claim 9, wherein tips of said magnetic poles have a plurality of holes which are bored in a rotational direction of said motor and which are aligned in an axial direction of said tips of said magnetic poles.

11. A synchronous motor and a control system therefor as recited in claim 9, wherein tips of said magnetic poles have a plurality of holes which are bored in an axial direction of said motor and which aligned in a rotational direction of said tips of said magnetic poles.

12. A synchronous motor and a control system therefor as recited in claim 10, wherein said holes are formed in a rectangular or round shape.

13. A synchronous motor and a control system therefor as recited in claim 9, wherein said armature current command means comprises: a first sine-wave generator for outputting a first sine-wave signal corresponding to said detected position, and a second sine-wave generator for outputting a second sine-wave signal having a phase which deviates by $\frac{2}{3}\pi$ from said first sine-wave signal, and a third sine-wave generator for outputting a third sine-wave signal having a phase which deviates by $4/3\pi$ from said first sine-wave signal, and first and second and third multiplier means for respectively multiplying said first and second and third sine-wave signals by said deviation.

14. A synchronous motor and a control system therefor as recited in claim 9, wherein said field current command means comprises: a converter for converting said detected speed into a converted speed in response to a predetermined function, a first sine-wave generator for outputting a first sine-wave signal corresponding to said position signal which deviates in phase by $\pi/2$ from said detected position; a second sine-wave generator for outputting a second sine-wave signal which deviates in phase by $\frac{2}{3}\pi$ from said first sine-wave signal corresponding to said position signal; a third sine-wave generator for outputting a third sine-wave signal which deviates in phase by $4/3\pi$ from said first sine-wave signal corresponding to said position signal and first and second and third multiplier means for respectively multiplying said first and second and third sine-wave signals by an output from said converter.

15. A synchronous motor and a control system therefor which comprises:
- a three-phase synchronous motor which ha a stator having windings and a rotor which is winding fee, said stator being of a right circular cylindrical shape so as to have a transverse section which is circular; said stator having slots which are symmetrically provided in an inner circular side thereof and having a pair of three-phase windings which allow a synthesized electrical current to be used as an armature current and field current and having radially symmetrical three-phase windings which are wound around said slots; said rotor comprising a salient-pole structure having a plurality of magnetic poles and composed of a magnetic material, the number of magnetic poles being equal to twice that of a positive integer; and a control unit comprising: a rotor position detection means for detecting a position of said rotor; a speed detection means for detecting a rotational speed of said rotor; a PID compensation means for compensating for a deviation between a speed command input and a speed signal detected by said speed detection means; a memory for storing driving current data of said synchronous motor; a motor current command means for receiving as inputs a compensated speed command from said PID compensation means, the speed signal detected by said speed detection means as a torque command which has been proportionated and integrated and a position signal detected by said rotor position detection means and for reading out current data from said memory so as to generate a three-phase motor current command in response thereto; and a current control means for receiving as an input said motor current command and for supplying current to said three-phase windings in response thereto.

16. A synchronous motor and a control system therefor as recited in claim 15, wherein said memory stores driving current data and driving voltage data for said synchronous motor, and said current control means comprises a PID amplifier, and a current amplifier and a current feedback means, and wherein the current data read out from said memory is inputted to an amplifier of said PID amplifier, and voltage data read out from said memory is added to an output from said PID amplifier.

* * * * *